(12) United States Patent
Yan

(10) Patent No.: US 11,930,232 B2
(45) Date of Patent: Mar. 12, 2024

(54) VIDEO PLAYING CONTROL METHOD, TERMINAL DEVICE, SERVER, AND STORAGE MEDIUM

(71) Applicant: Petal Cloud Technology Co., Ltd., Guangdong Province (CN)

(72) Inventor: Wei Yan, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/786,859

(22) PCT Filed: Oct. 30, 2020

(86) PCT No.: PCT/CN2020/125517
§ 371 (c)(1),
(2) Date: Jun. 17, 2022

(87) PCT Pub. No.: WO2021/120892
PCT Pub. Date: Jun. 24, 2021

(65) Prior Publication Data
US 2023/0039918 A1    Feb. 9, 2023

(30) Foreign Application Priority Data
Dec. 19, 2019    (CN) .......................... 201911317023.4

(51) Int. Cl.
*H04N 7/16*        (2011.01)
*H04N 21/2662*    (2011.01)
(Continued)

(52) U.S. Cl.
CPC ..... *H04N 21/2662* (2013.01); *H04N 21/4126* (2013.01); *H04N 21/4331* (2013.01); *H04N 21/44209* (2013.01); *H04N 21/8456* (2013.01)

(58) Field of Classification Search
CPC ........... H04N 21/2662; H04N 21/4425; H04N 21/4621; H04N 21/6582; H04N 21/6547;
(Continued)

(56) References Cited

U.S. PATENT DOCUMENTS

2004/0240390 A1    12/2004   Seckin
2009/0216897 A1     8/2009   Wang
(Continued)

FOREIGN PATENT DOCUMENTS

CN    101656887 A    2/2010
CN    103338401 A    10/2013
(Continued)

*Primary Examiner* — Gigi L Dubasky
(74) *Attorney, Agent, or Firm* — Conley Rose, P.C.

(57) ABSTRACT

A video playing control method includes obtaining a video playing policy, where the video playing policy determines information about a control algorithm used for video playing, determining according to the video playing policy, a target control algorithm used for video playing, downloading and playing a video by using the target control algorithm, collecting video playing quality indicator data in a process of downloading and playing the video, and uploading the quality indicator data to a server, to indicate the server to adjust the video playing policy based on the quality indicator data.

17 Claims, 12 Drawing Sheets

(51) Int. Cl.
  *H04N 21/41*   (2011.01)
  *H04N 21/433*  (2011.01)
  *H04N 21/442*  (2011.01)
  *H04N 21/845*  (2011.01)

(58) Field of Classification Search
  CPC ....... H04N 21/26208; H04N 21/26216; H04N 21/438; H04N 21/658; H04N 21/8456; H04N 21/44209
  See application file for complete search history.

(56) References Cited

U.S. PATENT DOCUMENTS

| | | |
|---|---|---|
| 2015/0085193 A1 | 3/2015 | Zhao |
| 2017/0155932 A1 | 6/2017 | Fu et al. |
| 2017/0155969 A1 | 6/2017 | Roy |
| 2021/0136435 A1* | 5/2021 | Stobbart .......... H04N 21/23439 |

FOREIGN PATENT DOCUMENTS

| | | | |
|---|---|---|---|
| CN | 105978910 A | 9/2016 | |
| CN | 107770633 A | 3/2018 | |
| CN | 108063961 A | 5/2018 | |
| CN | 110072130 A | 7/2019 | |
| CN | 110087109 A | 8/2019 | |
| CN | 110113642 A | 8/2019 | |
| CN | 110248247 A | 9/2019 | |
| CN | 110430461 A | 11/2019 | |
| CN | 110505454 A | 11/2019 | |
| WO | WO-2015010544 A1 * | 1/2015 | ..... H04N 21/234363 |

* cited by examiner

VIDEO PLAYING CONTROL METHOD, TERMINAL DEVICE, SERVER, AND STORAGE MEDIUM

CROSS-REFERENCE TO RELATED APPLICATIONS

This is a U.S. National Stage of International Patent Application No. PCT/CN2020/125517 filed on Oct. 30, 2020, which claims priority to Chinese Patent Application No. 201911317023.4 filed on Dec. 19, 2019. Both of the aforementioned applications are hereby incorporated by reference in their entireties.

TECHNICAL FIELD

This application belongs to the field of computer technologies, and in particular, to a video playing control method, a terminal device, a server, and a storage medium.

BACKGROUND

Currently, to improve an online video playing effect, a preset adaptive control algorithm is usually used to play a video. For example, a proper resolution and video playing start bit rate can be selected based on change of a user network bandwidth, or a bit rate can be adjusted during video playing, to ensure that video playing starts quickly, the video is smoothly played without freeze.

However, each parameter of an existing control algorithm is usually static empirical data obtained by testing a network model in a laboratory. Each quality indicator of video playing cannot be considered in a complex and changeable network condition. For example, if a playing start delay is short and zero freeze is required, a video bitstream with a low resolution and bit rate needs to be selected, but video playing definition is poor. If a video bitstream with a high resolution and bit rate is selected, the video playing definition is good, but the playing start delay is long and a freeze rate is high.

SUMMARY

In view of this, embodiments of this application provide a video playing control method, a terminal device, a server, and a storage medium, so as to take into consideration all quality indicators of video playing, and achieve a better video playing effect.

According to a first aspect, an embodiment of this application provides a video playing control method, including:

A terminal device obtains a video playing policy, where the video playing policy is used to determine information about a control algorithm used for current video playing.

The terminal device determines, according to the video playing policy, a target control algorithm used for current video playing.

The terminal device downloads and plays a video by using the target control algorithm.

The terminal device collects video playing quality indicator data in a process of downloading and playing a video.

The terminal device uploads the quality indicator data to a server, to indicate the server to adjust the video playing policy based on the quality indicator data.

When playing the video online, the terminal device obtains the video playing policy, determines, according to the video playing policy, the control algorithm set for a player, and controls downloading and playing of the video by using the control algorithm. In addition, during the process of downloading and playing the video, the player collects the video playing quality indicator data in real time and reports the data to the server. The server may receive the quality indicator data uploaded by a plurality of different terminal devices when a video is played, and perform big data analysis processing, so as to determine whether a current video playing policy can take into consideration each quality indicator of video playing and whether better video playing quality can be obtained. If the current video playing policy cannot meet the requirement, the server may adjust the video playing policy, for example, use a new control algorithm or adjust parameters of an original control algorithm, so as to implement adaptive adjustment of the control algorithm. All quality indicators of video playing can be considered to achieve better video playing effect.

In a possible implementation of the first aspect, the determining, by the terminal device according to the video playing policy, a target control algorithm used for current video playing may include:

The terminal device obtains a device type of the terminal device.

The terminal device selects, according to the video playing policy, a control algorithm corresponding to the device type from a plurality of preset control algorithms as the target control algorithm.

For different types of terminal devices, different control algorithms may be used to control video playing, so as to achieve a better video playing effect. For example, mobile phones have low requirements on video definition and a bit rate, and high requirements on a playing start delay and playing smoothness. A large-screen TV has a high requirement on the viewing definition and a low requirement on the playing start delay. Therefore, for the mobile phone device, a control algorithm that can implement the low playing start delay and high playing smoothness may be selected. For large-screen TV devices, a control algorithm that can realize high-definition playing can be selected.

In a possible implementation of the first aspect, the determining, by the terminal device according to the video playing policy, a target control algorithm used for current video playing may include:

The terminal device receives a first control algorithm delivered by the server.

The terminal device determines a version number of video playing software used for video playing.

The terminal device searches locally or from the server for a preset second control algorithm associated with the version number.

The terminal device selects the target control algorithm from the first control algorithm and the second control algorithm according to the video playing policy.

When playing a video, the terminal device usually uses a default control algorithm, for example, a preconfigured control algorithm associated with the version number of the video playing software. The control algorithm (that is, the second control algorithm) may be stored locally or in the server. In this embodiment of this application, the server may deliver, to each terminal device, the control algorithm (that is, the first control algorithm) that can be flexibly adjusted and the video playing policy, and the terminal device determines, according to the video playing policy, that a default first control algorithm or the second control algorithm delivered by the server is used for current video playing.

Further, the selecting, by the terminal device, the target control algorithm from the first control algorithm and the second control algorithm according to the video playing policy may include:

The terminal device obtains a historical record of each control algorithm used by the video playing software to play a video.

The terminal device determines an invocation ratio of the first control algorithm according to the video playing policy.

The terminal device selects a control algorithm from the first control algorithm and the second control algorithm based on the historical record and the invocation ratio as the target control algorithm.

For example, it is determined, according to the video playing policy, that the invocation ratio of the first control algorithm is 3:7. In 10 times of video playing initiated by the video playing software, the first control algorithm is used for three times, and the second control algorithm is used for seven times. Then, with reference to a record of each control algorithm used by the video playing software for historically playing a video, for example, control algorithms used for the previous nine times, it may be determined that the first control algorithm or the second control algorithm is used for playing the video this time.

Still further, the uploading, by the terminal device, the quality indicator data to a server, to indicate the server to adjust the video playing policy based on the quality indicator data may include:

The terminal device uploads the quality indicator data to the server, to indicate the server to adjust the invocation ratio based on the quality indicator data.

For example, the invocation ratio of the first control algorithm may be relatively low initially. In other words, a default relatively stable second control algorithm is more used. After receiving the upload quality indicator data that is used by each terminal device to play the video by using the first control algorithm, the server may analyze the quality indicator data, and further determine a video playing effect of the first control algorithm. If it is found that the video playing effect of the first control algorithm is better, the invocation ratio of the first control algorithm may be correspondingly increased, so as to improve the overall video playing effect.

Further, after the collecting, by the terminal device, video playing quality indicator data, the method may further include:

If the target control algorithm is the first control algorithm, the terminal device uploads the quality indicator data to the server, to indicate the server to adjust the first control algorithm and parameters of the first control algorithm based on the quality indicator data.

A factor or a parameter of the first control algorithm may be flexibly adjusted. Therefore, if the first control algorithm is used for current video playing, the server may adjust the first control algorithm and the parameter of the first control algorithm based on the quality indicator data uploaded by the terminal device. This improves the quality and effect of video playing.

Further, after the collecting, by the terminal device, video playing quality indicator data, the method may further include:

If the target control algorithm is the first control algorithm and the quality indicator data meets a preset condition, the terminal device cancels an association relationship between the second control algorithm and the version number, and associates the first control algorithm with the version number.

After receiving the upload quality indicator data that is used by each terminal device to play the video by using the first control algorithm, the server may analyze the quality indicator data, and further determine a video playing effect of the first control algorithm. If the quality indicator data meets a preset condition, it indicates that the video playing effect is relatively good and is better than that of the default second control algorithm. In this case, the association relationship between the second control algorithm and the version number may be canceled, and the first control algorithm is associated with the version number. The default control algorithm for subsequent video playing is updated to the first control algorithm.

Further, after the uploading, by the terminal device, the quality indicator data to a server, the method may further include.

The terminal device uploads information about the selected target control algorithm to the server, so as to indicate the server to analyze the quality indicator data based on the information about the selected target control algorithm, and generates a video playing quality indicator of the first control algorithm and a video playing quality indicator of the second control algorithm.

For example, terminal devices A, B, and C play a video by using the first control algorithm, and upload respective video playing quality indicator data to the server. Terminal devices R, S, T . . . play the video by using the second control algorithm, and upload the respective video playing quality indicator data to the server. The server performs big data analysis based on the received quality indicator data of each terminal device and the information about the used control algorithm, and may generate the video playing quality indicator of the first control algorithm and the video playing quality indicator of the second control algorithm. The video playing effect of different control algorithms can be viewed intuitively by relevant personnel.

In a possible implementation of the first aspect, in a process of downloading and playing a video by the terminal device, the method may further include:

The terminal device detects a current network download rate.

If the network download rate exceeds a first threshold, the terminal device obtains a video segment that has been buffered in a local buffer.

If a resolution of the buffered video segment is less than a second threshold and/or a bit rate is less than a third threshold, the terminal device downloads a video segment whose resolution is greater than or equal to the second threshold and whose bit rate is greater than or equal to the third threshold in a same time period; and replaces the buffered video segment.

In the process of downloading and playing the video, if a current network download rate is relatively high, a video segment that has been cached in a local buffer may be detected. If a resolution/bit rate of the cached video segment is relatively low, content with a higher resolution or bit rate in the same time period may be selected to be downloaded, and content in the local buffer is replaced, so as to resolve a problem that a user has poor viewing definition due to downloading content with a low resolution or a bit rate due to a network speed or a buffer watermark.

In another possible implementation of the first aspect, the proposed video playing control method includes:

After receiving a video playing request sent by a terminal device, a server sends a video playing policy to the terminal device, so as to indicate the terminal device to determine, according to the video playing policy, a target control algorithm used for current video playing, and download and play a video by using the target control algorithm, where the video playing policy is used to determine information about a control algorithm used for current video playing.

The server receives video playing quality index data uploaded by the terminal device, where the quality index data is obtained by the terminal device through collection in a process of downloading and playing a video.

The server adjusts the video playing policy according to the quality indicator data.

The server may receive the quality indicator data uploaded by a plurality of different terminal devices when a video is played, and perform big data analysis processing, so as to determine whether a current video playing policy can take into consideration each quality indicator of video playing and whether better video playing quality can be obtained. If the current video playing policy cannot meet the requirement, the server may adjust the video playing policy, for example, use a new control algorithm or adjust parameters of an original control algorithm, so as to implement adaptive adjustment of the control algorithm. All quality indicators of video playing can be considered to achieve better video playing effect.

Further, the video playing control method may further include:

The server receives information about the target control algorithm uploaded by the terminal device.

The server analyzes the quality indicator data based on the information about the target control algorithm, to generate a video playing quality indicator of the target control algorithm.

The server performs big data analysis based on the received quality indicator data of each terminal device and the information about the used control algorithm, and may generate the video playing quality indicator of each control algorithm, so that related personnel can intuitively view video playing effects of each different control algorithm.

According to a second aspect, an embodiment of this application provides a terminal device, including a memory, a processor, and a computer program that is stored in the memory and can run on the processor. When executing the computer program, the processor implements the video playing control method provided in the first aspect of the embodiments of this application.

According to a third aspect, an embodiment of this application provides a server, including a memory, a processor, and a computer program that is stored in the memory and can run on the processor. When executing the computer program, the processor implements the video playing control method provided in the first aspect of the embodiments of this application.

According to a fourth aspect, an embodiment of this application provides a computer-readable storage medium, where the computer-readable storage medium stores a computer program, and when the computer program is executed by a processor, the video playing control method provided in the first aspect of the embodiments of this application is implemented.

According to a fifth aspect, an embodiment of this application provides a computer program product. When the computer program product runs on a terminal device, the terminal device is enabled to perform the video playing control method according to any one of the first aspect.

Compared with the conventional technology, a beneficial effect of this embodiment of this application is that a server may receive quality indicator data uploaded by a plurality of different terminal devices when a video is played, and perform big data analysis processing, so as to determine whether a current video playing policy can take into consideration each quality indicator of video playing. If necessary, the server may adjust the video playing policy, for example, use a new control algorithm or adjust parameters of an original control algorithm, so as to implement adaptive adjustment of the control algorithm, and take into consideration each quality index of the video playing, thereby achieving a better video playing effect. This has better usability and practicability.

DESCRIPTION OF EMBODIMENTS

Figure 1:
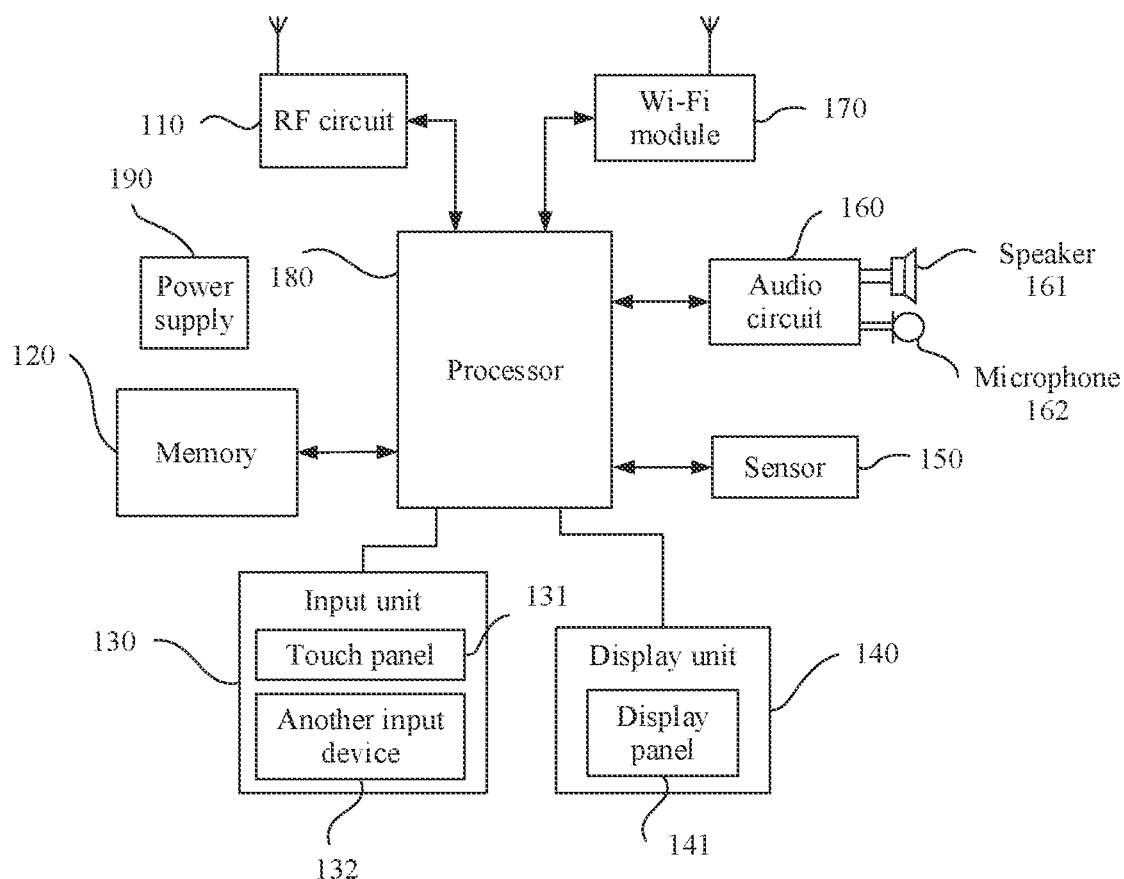
FIG. 1 is a schematic diagram of a structure of hardware of a mobile phone to which a video playing control method is applicable according to an embodiment of this application.

In the following description, to illustrate rather than limit, specific details such as a particular system structure and a technology are provided to make a thorough understanding of the embodiments of this application. However, a person skilled in the art should know that this application may also be implemented in other embodiments without these specific details. In other cases, detailed descriptions of well-known systems, systems, circuits, and methods are omitted, so that this application is described without being obscured by unnecessary details.

Terms used in the following embodiments are merely intended to describe particular embodiments, but are not intended to limit this application. Terms "one", "a" and "this" of singular forms used in this specification and the appended claims of this application are also intended to include expressions such as "one or more", unless otherwise specified in the context clearly. It should be further understood that, in embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects.

The video playing control method provided in the embodiments of this application may be applied to a terminal device and a server, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). Specific types of the terminal device and the server are not limited in this embodiment of this application.

For example, the terminal device may be a station (STAION, ST) in a WLAN, and may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device or other processing device connected to a wireless modem, a vehicle-mounted device, an internet of vehicle terminal, a computer, a laptop computer, a handheld communications device, a handheld computing device, a satellite wireless device, a wireless modem card, a television set-top box (set-top box, STB), a customer premise equipment (customer premise equipment, CPE), or another device for communicating over a wireless system, and a next-generation communications system, for example, a mobile terminal in a 5G network, or a mobile terminal in a future evolved public land mobile network (Public Land Mobile Network, PLMN) network.

By way of example and not limitation, when the terminal device is a wearable device, the wearable device may alternatively be a generic term for wearable devices such as glasses, gloves, watches, clothes, and shoes that are developed based on intelligent design of daily wearing by using wearable technologies. The wearable device is directly worn, or is a portable device integrated into clothes or an accessory of the user. The wearable device is more than a hardware device. The wearable device implements powerful functions through software support, data exchange, and cloud interaction. In a broad sense, the wearable intelligent device includes a device that provides a complete function, has a large size, and can implement all or some functions without relying on a smartphone, for example, a smartwatch or smart glasses; and includes a device that focuses only on a specific type of application and needs to be used in combination with another device such as a smartphone, for example, various smart bands and smart jewelry used for vital sign monitoring.

For example, the terminal device is a mobile phone. FIG. 1 is a block diagram of a partial structure of the mobile phone according to an embodiment of this application. Refer to FIG. 1. The mobile phone includes components such as a radio frequency (Radio Frequency. RF) circuit 110, a memory 120, an input unit 130, a display unit 140, a sensor 150, an audio circuit 160, a wireless fidelity (wireless fidelity, WiFi) module 170, a processor 180, and a power source 190. A person skilled in the art may understand that a structure of the mobile phone shown in FIG. 1 does not constitute a limitation on the mobile phone. The mobile phone may include more or fewer components than those shown in the figure, or may include a combination of some components, or may include different component arrangements.

The following describes each component of the mobile phone in detail with reference to FIG. 1.

The RF circuit 110 may be configured to receive and send a signal in an information receiving or sending process or a call process. Particularly, after receiving downlink information from a base station, the RF circuit 110 sends the downlink information to the processor 180 for processing, and in addition, sends designed uplink data to the base station. Usually, an RF circuit includes but is not limited to an antenna, at least one amplifier, a transceiver, a coupler, a low noise amplifier (Low Noise Amplifier, LNA), a duplexer, and the like. In addition, the RF circuit 110 may further communicate with a network and another device through wireless communication. The foregoing wireless communications may use any communications standard or protocol, which includes but is not limited to a global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

The memory 120 may be configured to store a software program and a module. By running the software program and the module that are stored in the memory 120, the processor 180 performs various function applications and data processing of the mobile phone. The memory 120 may mainly include a program storage area and a data storage area. The program storage area may store an operating system, an application program required by at least one function (for example, a sound playing function or an image playing function), and the like. The data storage area may store data (for example, audio data or an address book) and the like created based on use of the mobile phone. In addition, the memory 120 may include a high-speed random access memory, or may include a nonvolatile memory, such as at least one magnetic disk storage device, a flash memory device, or another volatile solid-state storage device.

The input unit 130 may be configured to: receive entered digital or character information, and generate key signal input related to a user setting and function control of the mobile phone 100. Specifically, the input unit 130 may include a touch panel 131 and another input device 132. The touch panel 131, also referred to as a touchscreen, may collect a touch operation of a user on or near the touch panel 131 (such as an operation of the user on the touch panel 131 or near the touch panel 131 by using any suitable object or attachment, such as a finger or a touch pen), and drive a corresponding connection system according to a preset program. Optionally, the touch panel 131 may include two parts: a touch detection system and a touch controller. The touch detection system detects a touch position of the user, detects a signal generated by the touch operation, and transfers the signal to the touch controller. The touch controller receives touch information from the touch detection system, converts the touch information into touch point coordinates, and then sends the touch point coordinates to the processor 180. Moreover, the touch controller can receive and execute a command sent from the processor 180. In addition, the touch panel 131 may be implemented by using a plurality of types, such as a resistive type, a capacitive type, an infrared ray type, and a surface acoustic wave type. In addition to the touch panel 131, the input unit 130 may include the another input device 132. Specifically, the another input device 132 may include but be not limited to one or more of a physical keyboard, a functional key (such as a volume control key or an on/off key), a trackball, a mouse, or a joystick.

The display unit 140 may be configured to display information entered by the user or information provided for the user, and various menus of the mobile phone. The display unit 140 may include a display panel 141. Optionally, the display panel 141 may be configured by using a liquid crystal display (Liquid Crystal Display, LCD), an organic light-emitting diode (Organic Light-Emitting Diode, OLED), or the like. Further, the touch panel 131 may cover the display panel 141. When detecting the touch operation on or near the touch panel 131, the touch panel 131 transfers the touch operation to the processor 180 to determine a type of a touch event, and then the processor 180 provides corresponding visual output on the display panel 141 based on the type of the touch event. In FIG. 1, the touch panel 131 and the display panel 141 are used as two independent components to implement input and input functions of the mobile phone. However, in some embodiments, the touch panel 131 and the display panel 141 may be integrated to implement the input and output functions of the mobile phone.

The mobile phone 100 may further include at least one type of sensor 150, for example, a light sensor, a motion sensor, and another sensor. Specifically, the light sensor may include an ambient light sensor and a proximity sensor. The ambient light sensor may adjust luminance of the display panel 141 based on brightness of ambient light, and the proximity sensor may turn off the display panel 141 and/or backlight when the mobile phone approaches an ear of the user. As a type of movement sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein.

The audio frequency circuit 160, a loudspeaker 161, and a microphone 162 may provide an audio interface between the user and the mobile phone. The audio circuit 160 may transmit, to the speaker 161, an electrical signal that is converted from received audio data, and the speaker 161 converts the electrical signal into a sound signal for output. In addition, the microphone 162 converts a collected sound signal into an electrical signal, and the audio circuit 160 receives the electrical signal, converts the electrical signal into audio data, and outputs the audio data to the processor 180 for processing, to send the audio data to, for example, another mobile phone by using the RF circuit 110, or output the audio data to the memory 120 for further processing.

Wi-Fi belongs to a short-distance wireless transmission technology. The mobile phone may help, by using the Wi-Fi module 170, the user receive and send an email, browse a web page, access streaming media, and the like. The Wi-Fi module 170 provides wireless broadband internet access for the user. Although FIG. 1 shows the Wi-Fi module 170, it can be understood that the Wi-Fi module 170 is not a necessary part of the mobile phone 100 and may certainly be omitted as required provided that the essence of the present invention is not changed.

The processor 180 is a control center of the mobile phone, and uses various interfaces and lines to connect all parts of the entire mobile phone. By running or executing the software program and/or the module that are/is stored in the memory 120 and invoking data stored in the memory 120, the processor 180 executes various functions and data processing of the mobile phone, so as to perform overall monitoring on the mobile phone. Optionally, the processor 180 may include one or more processing units. Preferably, the processor 180 may integrate an application processor and a modem processor. The application processor mainly processes an operating system, a user interface, an application, and the like. The modem processor mainly processes wireless communication. It may be understood that the foregoing modem processor may be not integrated into the processor 180.

The mobile phone 100 further includes a power supply 190 (for example, a battery) supplying power to the components. Preferably, the power supply may be logically connected to the processor 180 by using a power management system, to implement functions such as charging and discharging management and power consumption management by using the power management system.

Although not shown, the mobile phone 100 may further include a camera. Optionally, a position of the camera on the mobile phone 100 may be front-facing or rear-facing. This is not limited in this embodiment of this application.

Optionally, the mobile phone 100 may include a single camera, dual-camera, triple-lens camera, or the like. This is not limited in this embodiment of this application.

For example, the mobile phone 100 may include a triple-lens camera, where one is a primary camera, one is a wide-angle camera, and one is a long-focus camera.

Optionally, when the mobile phone 100 includes a plurality of cameras, the plurality of cameras may be all front-facing, or all rear-facing, or some front-facing and some rear-facing. This is not limited in this embodiment of this application.

In addition, although not shown in the figure, the terminal 100 may further include a Bluetooth module and the like. Details are not described herein.

Currently, to improve an online video playing effect, a preset adaptive control algorithm is usually used to play a video. For example, if a network bandwidth fluctuates greatly during video playing, an appropriate bit rate of a resolution is selected based on the network bandwidth change to start video playing, or a bit rate is adjusted during video playing, to ensure fast video playing, smooth video playing, and zero freeze. Specifically, the control algorithms include a user bandwidth estimation algorithm, a playing start bit rate selection algorithm, an algorithm for selecting a download bit rate based on a change of a user network in a playing process, and the like. For example, HLS and DASH protocols are used. In a process of starting or playing a video, a subsequent download rate of a user is estimated based on download rates of a plurality of actual video segments before the user currently wants to download a video segment by using a set algorithm, a factor, a coefficient, and the like, and a bit rate of a next to-be-downloaded video segment is selected. The target is that zero freeze occurs during the video playing.

However, each parameter of an existing control algorithm is static empirical data obtained based on a network model test in a laboratory. For a current network of tens of millions of users, a static algorithm and parameters are used, and therefore, each quality index of video playing cannot be considered. For example, if a playing start delay is short and zero freeze is required, a video bitstream with a low resolution and bit rate needs to be selected, but video playing definition is poor. If a video bitstream with a high resolution and bit rate is selected, the video playing definition is good, but the playing start delay is long and a freeze rate is high.

In actual situations, to reduce the playing start delay and the freeze rate, a resolution and bit rate that are lower than a matched user bandwidth are usually selected, so as to obtain good playing smoothness and reduce the playing start delay. In this way, after the video playing starts, the video cannot be switched to a high resolution or bit rate within a short period of time even if the network of the user is good. As a result, definition of a large-screen TV cannot match Blu-ray video quality, and the user cannot watch video content with better video quality.

Figure 2:
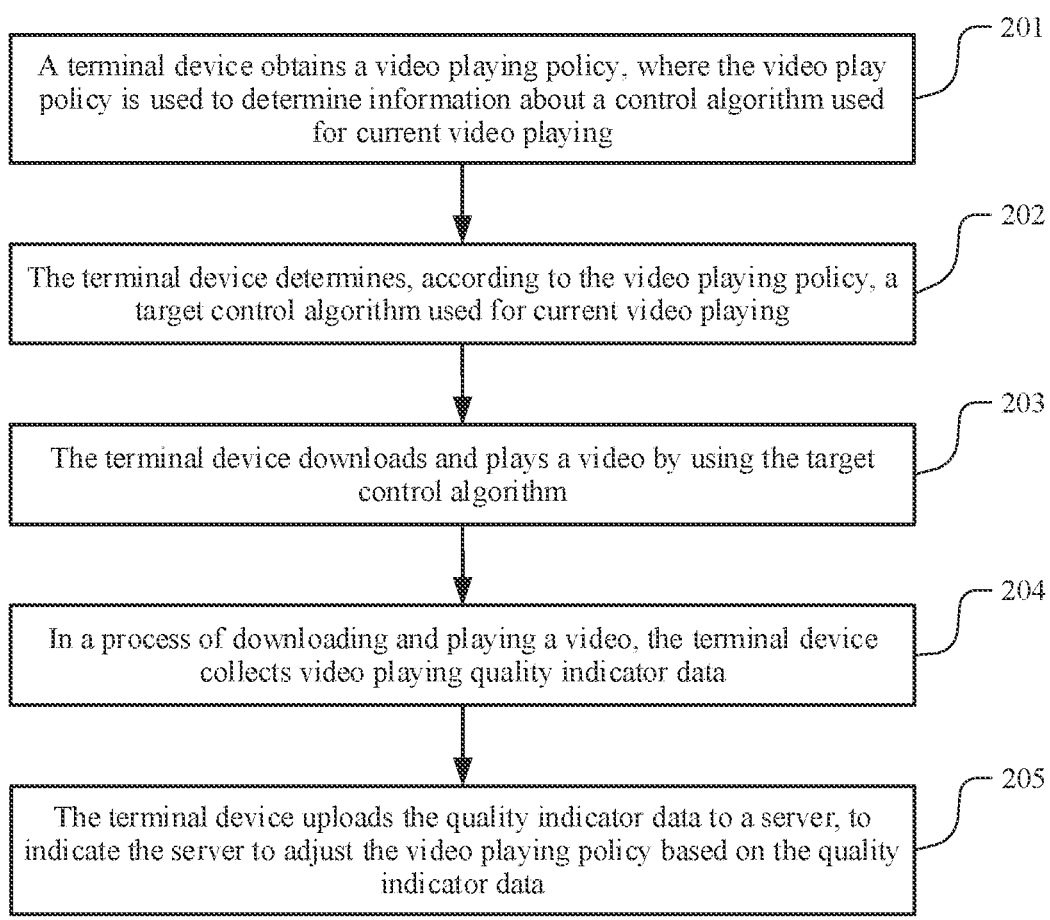
FIG. 2 is a flowchart of a video playing control method according to an embodiment of this application.

FIG. 2 is a flowchart of a video playing control method according to this application. The method includes the following steps.

201: A terminal device obtains a video playing policy, where the video playing policy is used to determine information about a control algorithm used for current video playing.

In this embodiment of this application, the video playing control method is performed by any type of terminal device. After starting a video playing software, the terminal device may obtain a video playing policy, where the video playing policy is used to determine information about a control algorithm used for current video playing. Specifically, the video playing policy may be provided by a server. An administrator may set and store a plurality of different video playing policies on the server. After receiving a video playing request sent by the terminal device, the server delivers the video playing policy to the terminal device.

202: The terminal device determines, according to the video playing policy, a target control algorithm used for current video playing.

After obtaining the video playing policy, the terminal device determines, according to the video playing policy, a target control algorithm used for current video playing, where the target control algorithm is preferably selected as a bit rate adaptive control algorithm. For example, preset control algorithms include an algorithm A and an algorithm B. The algorithm A focuses on smoothness of video playing, and the algorithm B focuses on definition of video playing. If the obtained video playing policy tends to ensure smoothness of video playing, the algorithm A may be selected as the control algorithm used for current video playing, that is, the target control algorithm.

203. The terminal device downloads and plays a video by using the target control algorithm.

After determining the target control algorithm used for current video playing, the terminal device downloads and plays the video by using the target control algorithm. In other words, a control manner and a playing parameter of a player are set according to the target control algorithm. In addition, sometimes, before the video is played, the terminal device further needs to send an authentication request for playing to a video operation system, and only after the operation system returns a result indicating that authentication succeeds, the terminal device starts to download and play the video. Specifically, the terminal device may download to-be-played video data from a specified CDN server.

204: The terminal device collects video playing quality indicator data in a process of downloading and playing a video.

In the process of downloading and playing the video, the terminal device further collects the video playing quality indicator data in real time, for example, indicator data related to the video playing quality, such as a playing start delay, a zero freeze rate, playing definition, and playing success/failure. It should be understood that a time for collecting the quality indicator data may include three phases: a video playing start, a video playing process, and a video playing end.

Further, in the process of downloading and playing the video, the method may further include:

(1). The terminal device detects a current network download rate.

(2). If the network download rate exceeds a first threshold, the terminal device obtains a video segment that has been buffered in a local buffer.

(3). If a resolution of the buffered video segment is less than a second threshold and/or a bit rate is less than a third threshold, the terminal device downloads a video segment whose resolution is greater than or equal to the second threshold and whose bit rate is greater than or equal to the third threshold in a same time period; and replaces the buffered video segment.

A video segment is also called a video slice. During video encoding, a piece of content is divided into a plurality of slices of 2 s to 10 s. During video playing, the video slice is downloaded to a local buffer for playing in a small slice downloading manner. The playing in slice mode is cost-effective and applicable to a large-scale OTT VOD or live TV scenario.

In the process of downloading and playing the video, if a current network download rate is relatively high, a video segment that has been cached in a local buffer may be detected. If a resolution/bit rate of the cached video segment is relatively low, content with a higher resolution or bit rate in the same time period may be selected to be downloaded, and content in the local buffer is replaced, so as to resolve a problem that a user has poor viewing definition due to downloading content with a low resolution or a bit rate due to a network speed or a buffer watermark.

For example, a user network of a live network often fluctuates. When network quality is poor, a low-resolution 480P bitstream is downloaded to the buffer through a bit rate adaptation algorithm. In this embodiment of this application, the previously downloaded low-resolution 480P bitstream is automatically replaced with a high-resolution 1080P bitstream based on the user network and information about the current buffer, so as to improve viewing video quality of the user.

205: The terminal device uploads the quality indicator data to the server, to indicate the server to adjust the video playing policy based on the quality indicator data.

After collecting the video playing quality indicator data, the terminal device uploads the data to a server, to indicate the server to adjust the video playing policy based on the quality indicator data. Specifically, the server may be a server that delivers the video playing policy to each terminal device, and is configured to control video playing. After receiving the quality indicator data, the server may analyze and process the data, so as to determine whether a current video playing policy can take into consideration each quality indicator of video playing and whether better video playing quality can be obtained. When necessary, the video playing policy may be adjusted, for example, a new control algorithm is used or parameters of an original control algorithm is adjusted, so as to achieve a better video playing effect.

In this embodiment of this application, when playing the video online, the terminal device obtains the video playing policy, determines, according to the video playing policy, the control algorithm set for a player, and controls downloading and playing of the video by using the control algorithm. In addition, during the process of downloading and playing the video, the player collects the video playing quality indicator data in real time and reports the data to the server. The server may receive the quality indicator data uploaded by a plurality of different terminal devices when a video is played, and perform big data analysis processing, so as to determine whether a current video playing policy can take into consideration each quality indicator of video playing and whether better video playing quality can be obtained. If the current video playing policy cannot meet the requirement, the server may adjust the video playing policy, for example, use a new control algorithm or adjust parameters of an original control algorithm, so as to implement adaptive adjustment of the control algorithm. All quality indicators of video playing can be considered to achieve better video playing effect.

Figure 3:
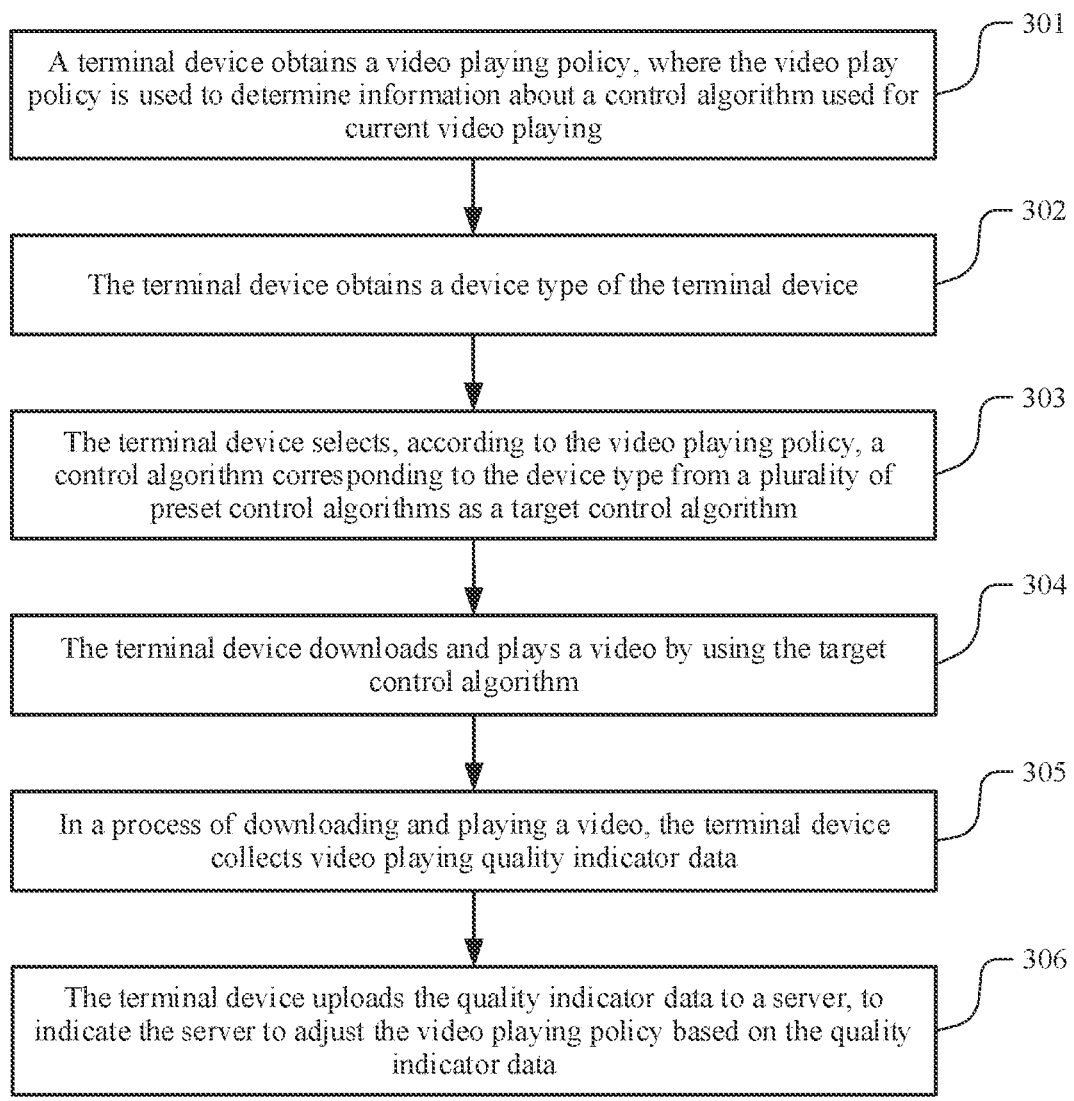
FIG. 3 is a flowchart of another video playing control method according to an embodiment of this application.

FIG. 3 is a flowchart of another video playing control method according to this application. The method includes the following steps.

301: A terminal device obtains a video playing policy, where the video playing policy is used to determine information about a control algorithm used for current video playing.

In this embodiment of this application, the video playing control method is performed by any type of terminal device. After starting a video playing software, the terminal device may obtain a video playing policy, where the video playing policy is used to determine information about a control algorithm used for current video playing. For a specific description of step 301, refer to step 201.

302: The terminal device obtains a device type of the terminal device.

After obtaining the video playing policy, the terminal device detects the device type of the terminal device, for example, a small-screen mobile phone, a large-screen mobile phone, a pad, a large-screen television, or a notebook computer.

303: The terminal device selects, according to the video playing policy, a control algorithm corresponding to the device type from a plurality of preset control algorithms as a target control algorithm.

For different types of terminal devices, different control algorithms may be used to control video playing, so as to achieve a better video playing effect. For example, mobile phones have low requirements on video definition and a bit rate, and high requirements on a playing start delay and playing smoothness. A large-screen TV has a high requirement on the viewing definition and a low requirement on the playing start delay. Therefore, for the mobile phone device, a control algorithm that can implement the low playing start delay and high playing smoothness may be selected. For large-screen TV devices, a control algorithm that can realize high-definition playing can be selected. Through this setting, the video playing control method can be applied to a plurality of different use scenarios, thereby extending generality of the method.

304: The terminal device downloads and plays a video by using the target control algorithm.

305: The terminal device collects video playing quality indicator data in a process of downloading and playing a video.

306: The terminal device uploads the quality indicator data to a server, to indicate the server to adjust the video playing policy based on the quality indicator data.

For specific descriptions of steps 304 to 306, refer to steps 203 to 205.

For ease of describing the control method in the embodiments of this application, the following uses an actual application example.

A video service carrier has provided 500,000 hours of video content on the live network. Initially, the carrier provides services for mobile phones, providing bitstreams for mobile phones and large-screen TV terminals to which 480P, 720P, or 1080P bit rates apply. An original bit rate adaptation algorithm mainly applies to mobile phones and uses static algorithms and fixed parameters. The mobile phones have a small screen size, and the bit rate adaptation algorithm is conservative. Therefore, after the video playing starts, users need to watch content with a low resolution or bit rate for a long time. Even when the user's network is in good condition, it still takes more than 80 seconds to switch to 1080P Blu-ray video quality.

Because the screen of the mobile phone user is small, even a low resolution or bit rate is acceptable when the user watches a video. However, if the foregoing bit rate adaptation algorithm is still used when video playing of a large-screen TV is subsequently operated, a resolution of the Blu-ray video quality cannot be switched to for a long time after the video playing starts. This causes a great impact on user viewing experience, and cannot be accepted by the user. To solve this problem, in this embodiment of this application, a video playing policy is set, and a control algorithm dedicated to the large-screen TV is selected. For example, it may be set specifically for the large-screen TV that an average value algorithm may be used or parameters may be modified for a predicted bandwidth, so as to flexibly adjust the algorithm. In this way, the large-screen TV can quickly switch to Blu-ray video quality after the video playing starts. In addition, the video playing quality indicator data can be comprehensively analyzed, including a playing start delay, a zero freeze rate, and high-quality playing duration. A parameter and factor of the control algorithm can be flexibly adjusted based on a data analysis result, to achieve optimal viewing experience for large-screen TV users.

In this embodiment of this application, when playing the video online, the terminal device obtains the video playing policy, determines, according to the video playing policy, the control algorithm set for a player, and controls downloading and playing of the video by using the control algorithm. In addition, during the process of downloading and playing the video, the player collects the video playing quality indicator data in real time and reports the data to the server. The server may receive the quality indicator data uploaded by a plurality of different terminal devices when a video is played, and perform big data analysis processing, so as to determine whether a current video playing policy can take into consideration each quality indicator of video playing and whether better video playing quality can be obtained. In addition, for different types of terminal devices, different control algorithms may be separately used to control video playing, so that the video playing control method can be applicable to a plurality of different use scenarios, thereby extending generality of the method.

Figure 4:
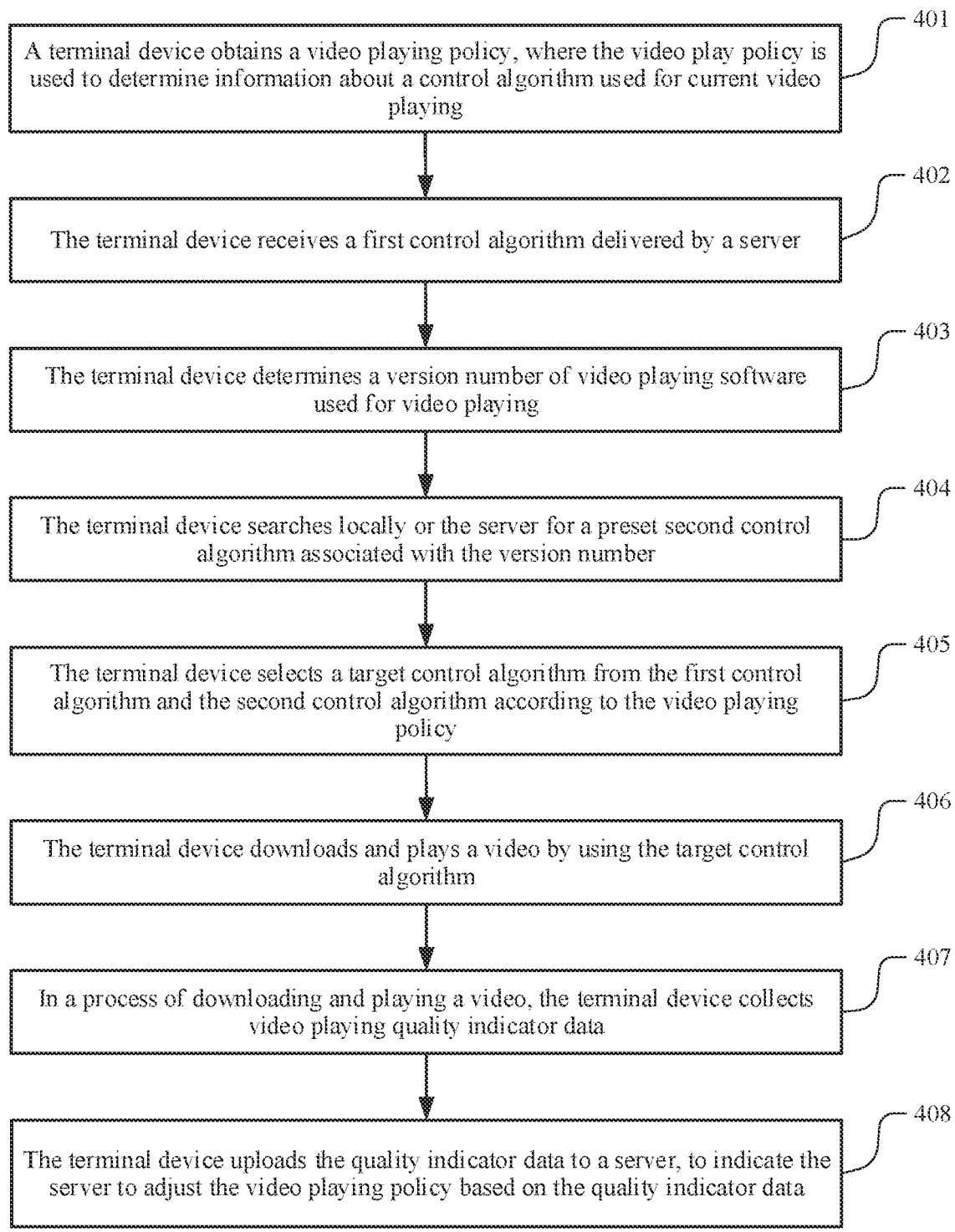
FIG. 4 is a flowchart of another video playing control method according to an embodiment of this application.

FIG. 4 is a flowchart of another video playing control method according to this application. The method includes the following steps.

401: A terminal device obtains a video playing policy, where the video playing policy is used to determine information about a control algorithm used for current video playing.

In this embodiment of this application, the video playing control method is performed by any type of terminal device. After starting a video playing software, the terminal device may obtain a video playing policy, where the video playing policy is used to determine information about a control algorithm used for current video playing. For a specific description of this step, refer to step 201.

402: The terminal device receives a first control algorithm delivered by a server.

In this embodiment of this application, the terminal device receives not only the video playing policy from the server, but also includes the first control algorithm. The algorithm itself and the factor or the parameter of the first control algorithm can be dynamically adjusted. An administrator initializes the first control algorithm and the algorithm parameter on the server side, and when adjusting the video playing policy in a subsequent step, the administrator may adjust the first control algorithm and the algorithm parameter accordingly, so as to achieve a better video playing effect.

403: The terminal device determines a version number of video playing software used for video playing.

404: The terminal device searches locally or from the server for a preset second control algorithm associated with the version number.

Usually, each video playing software has a default control algorithm, and the default control algorithm is usually used when a video is played. In addition, default control algorithms used by different versions of software are usually different. Therefore, to obtain the default control algorithm (that is, the second control algorithm), the terminal device first needs to determine a version number of the video playing software used for video playing, and then searches for a control algorithm associated with the version number. The default control algorithm may be searched locally from the terminal device, may be searched from the server, or may be searched from any device interacting with the terminal device.

405: The terminal device selects a target control algorithm from the first control algorithm and the second control algorithm according to the video playing policy.

After obtaining the first control algorithm and the second control algorithm, the terminal device selects one of the first control algorithm and the second control algorithm according to the video playing policy as the target control algorithm to be used.

Figure 5:
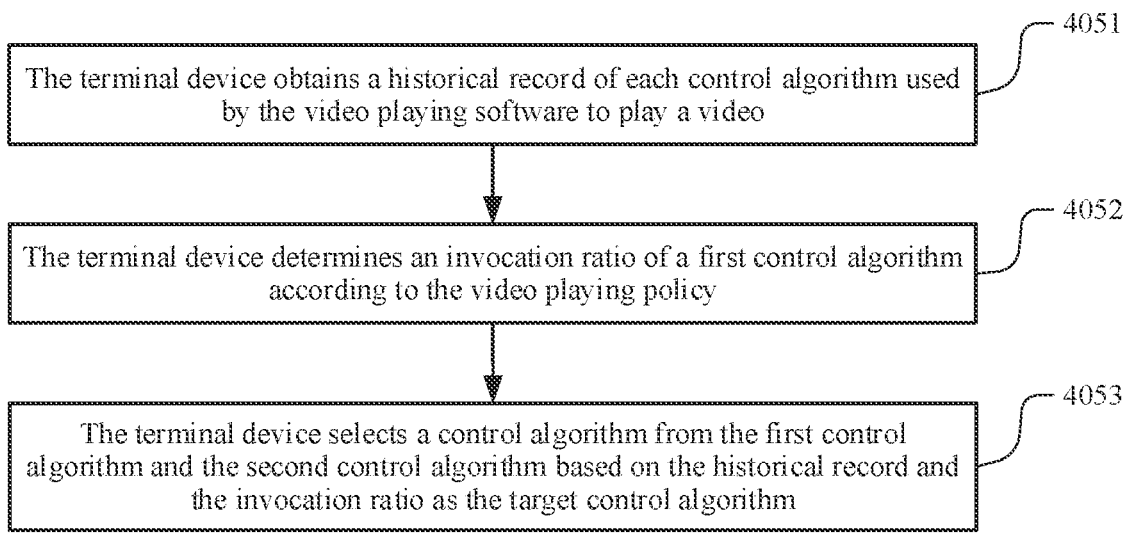
FIG. 5 is a flowchart of a specific implementation of step 405 in FIG. 4.

Specifically, as shown in FIG. 5, step 405 may include the following steps:

4051: The terminal device obtains a historical record of each control algorithm used by the video playing software to play a video.

4052: The terminal device determines an invocation ratio of the first control algorithm according to the video playing policy.

4053: The terminal device selects a control algorithm from the first control algorithm and the second control algorithm based on the historical record and the invocation ratio as the target control algorithm.

For example, it is determined, according to the video playing policy, that the invocation ratio of the first control algorithm is 3:7. In 10 times of video playing initiated by the video playing software, the first control algorithm is used for three times, and the second control algorithm is used for seven times. Then, with reference to a record of each control algorithm used by the video playing software for historically playing a video, for example, control algorithms used for the previous nine times, it may be determined that the first control algorithm or the second control algorithm is used for playing the video this time.

In addition, the first control algorithm or the second control algorithm may also be directly determined to be used according to the video playing policy. For example, if a policy 1 is received, the first control algorithm is determined to be used for current video playing. If a policy 2 is received, the second control algorithm is determined to be used for current video playing.

406: The terminal device downloads and plays a video by using the target control algorithm.

407: The terminal device collects video playing quality indicator data in a process of downloading and playing a video.

For specific descriptions of steps 406 and 407, refer to steps 203 and 204.

Specifically, after the terminal device collects the video playing quality indicator data, the method may further include:

If the target control algorithm is the first control algorithm, the terminal device uploads the quality indicator data to the server, to indicate the server to adjust the first control algorithm and parameters of the first control algorithm based on the quality indicator data.

A factor or a parameter of the first control algorithm may be flexibly adjusted. Therefore, if the first control algorithm is used for current video playing, the server may adjust the first control algorithm and the parameter of the first control algorithm based on the quality indicator data uploaded by the terminal device. This improves the quality and effect of video playing.

Specifically, after the terminal device collects the video playing quality indicator data, the method may further include:

If the target control algorithm is the first control algorithm and the quality indicator data meets a preset condition, the terminal device cancels an association relationship between the second control algorithm and the version number, and associates the first control algorithm with the version number.

After receiving the upload quality indicator data that is used by each terminal device to play the video by using the first control algorithm, the server may analyze the quality indicator data, and further determine a video playing effect of the first control algorithm. If the quality indicator data meets a preset condition, it indicates that the video playing effect is relatively good and is better than that of the default second control algorithm. In this case, the terminal device may cancel the association relationship between the second control algorithm and the version number, and the first control algorithm is associated with the version number. The default control algorithm for subsequent video playing is updated to the first control algorithm. In addition, the administrator may also associate the first control algorithm with a next version number of the video playing software.

408: The terminal device uploads the quality indicator data to the server, to indicate the server to adjust the video playing policy based on the quality indicator data.

Specifically, that the terminal device uploads the quality indicator data to the server, to indicate the server to adjust the video playing policy based on the quality indicator data may include:

The terminal device uploads the quality indicator data to the server, to indicate the server to adjust the invocation ratio based on the quality indicator data.

For example, the invocation ratio of the first control algorithm may be relatively low initially. In other words, a default relatively stable second control algorithm is more used. After receiving the upload quality indicator data that is used by each terminal device to play the video by using the first control algorithm, the server may analyze the quality indicator data, and further determine a video playing effect of the first control algorithm. If it is found that the video playing effect of the first control algorithm is better, the invocation ratio of the first control algorithm may be correspondingly increased, so as to improve the overall video playing effect.

Specifically, after that the terminal device uploads the quality indicator data to the server, the method may further include:

The terminal device uploads information about the selected target control algorithm to the server, so as to indicate the server to analyze the quality indicator data based on the information about the selected target control algorithm, and generates a video playing quality indicator of the first control algorithm and a video playing quality indicator of the second control algorithm.

For example, terminal devices A, B, and C play a video by using the first control algorithm, and upload respective video playing quality indicator data to the server. Terminal devices R, S, T . . . play the video by using the second control algorithm, and upload respective video playing quality indicator data to the server. The server performs big data analysis based on the received quality indicator data of each terminal device and the information about the used control algorithm, and may generate the video playing quality indicator of the first control algorithm and the video playing quality indicator of the second control algorithm. The video playing effect of different control algorithms can be viewed intuitively by relevant personnel. Specifically, the video playing quality indicators may include a playing start delay, a zero freeze rate, a playing success rate, playing duration of resolutions (such as 1080P Blu-ray, 720P HD, and 480P SD), and resolution/bit rate switching information.

In this embodiment of this application, when playing the video online, the terminal device obtains the video playing policy, determines, according to the video playing policy, the control algorithm set for a player, and controls downloading and playing of the video by using the control algorithm. In addition, during the process of downloading and playing the video, the player collects the video playing quality indicator data in real time and reports the data to the server. The server may receive the quality indicator data uploaded by a plurality of different terminal devices when a video is played, and perform big data analysis processing, so as to determine whether a current video playing policy can take into consideration each quality indicator of video playing and whether better video playing quality can be obtained. If the current video playing policy cannot meet the requirement, the server may adjust the video playing policy, for example, use a new control algorithm or adjust parameters of an original control algorithm, so as to implement adaptive adjustment of the control algorithm. All quality indicators of video playing can be considered to achieve better video playing effect.

Figure 6:
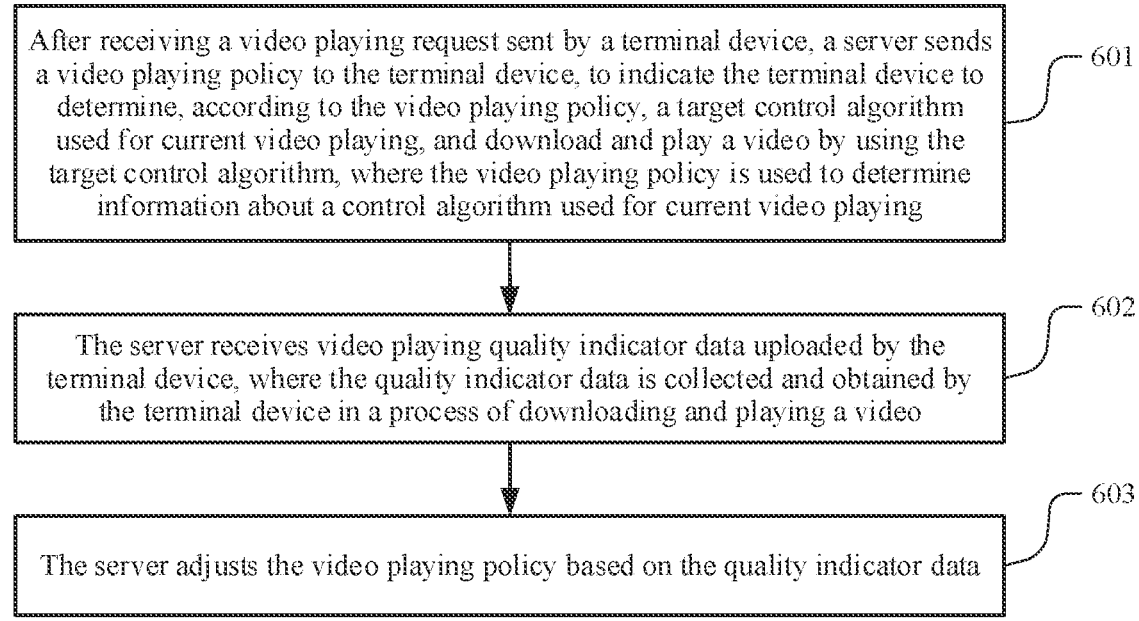
FIG. 6 is a flowchart of another video playing control method according to an embodiment of this application.

FIG. 6 is a flowchart of another video playing control method according to this application. The method includes the following steps.

601: After receiving a video playing request sent by a terminal device, a server sends a video playing policy to the terminal device, so as to indicate the terminal device to determine, according to the video playing policy, a target control algorithm used for current video playing, and download and play a video by using the target control algorithm, where the video playing policy is used to determine information about a control algorithm used for current video playing.

602: The server receives video playing quality index data uploaded by the terminal device, where the quality index data is obtained by the terminal device through collection in a process of downloading and playing a video.

603: The server adjusts the video playing policy according to the quality indicator data.

Further, the video playing control method may further include:

The server receives information about the target control algorithm uploaded by the terminal device.

The server analyzes the quality indicator data based on the information about the target control algorithm, to generate a video playing quality indicator of the target control algorithm.

In this embodiment of this application, the video playing control method may be performed by a server configured to control video playing. An operation administrator sets a video playing policy and different adaptive control algorithms on the server. After starting video playing software, a terminal device sends a video playing request to the server, and the server delivers the video playing policy to the terminal device based on the video playing request. In addition, the server may further simultaneously deliver one or more control algorithms to the terminal device, and then determine, according to the video playing policy, a control algorithm used for current video playing.

Then, a player of the terminal device uploads the video playing quality indicator data to the server. The server analyzes the received quality indicator data, and determines whether the video playing policy needs to be adjusted, for example, adjusting a used control algorithm or adjusting each parameter of the control algorithm. It should be understood that the server may be interconnected with a plurality of different terminal devices, that is, receive quality indicator data and a used control algorithm that are uploaded by the plurality of different terminal devices when a video is played, and perform big data analysis on the data. It may be determined whether the current video playing policy can take into consideration each quality indicator of the video playing, and whether relatively good video playing quality can be obtained. In addition, the server may further generate a video playing quality index of each control algorithm, so that relevant personnel can intuitively view video playing effects of each control algorithm.

An embodiment of this application further provides a server, including a memory, a processor, and a computer program that is stored in the memory and that can run on the processor. When executing the computer program, the processor implements the video playing control method shown in FIG. 6 of this application.

Figure 7:
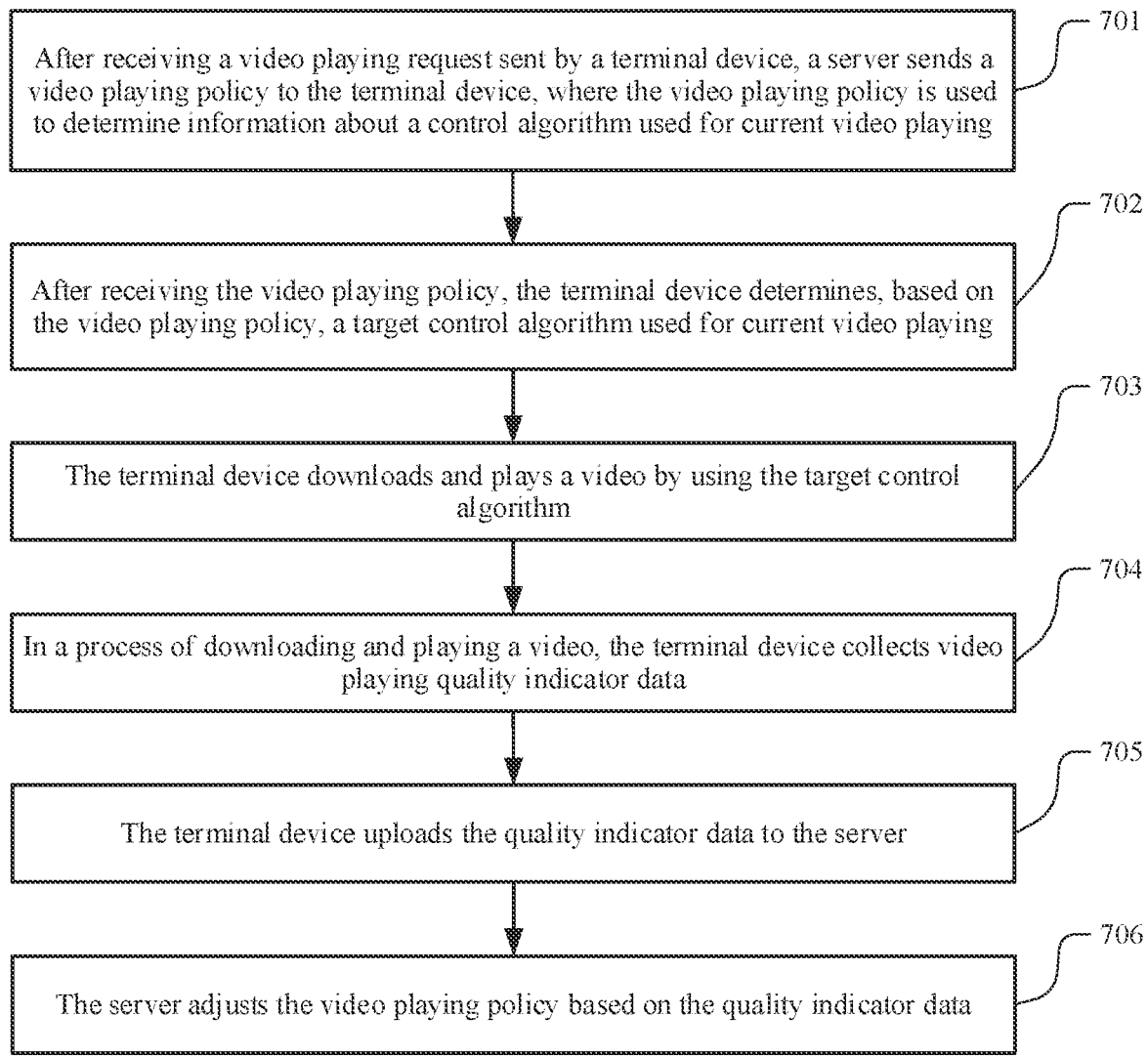
FIG. 7 is a flowchart of another video playing control method according to an embodiment of this application.

FIG. 7 is a flowchart of another video playing control method according to this application. The method includes the following steps.

701: After receiving a video playing request sent by a terminal device, a server sends a video playing policy to the terminal device, where the video playing policy is used to determine information about a control algorithm used for current video playing.

702: After receiving the video playing policy, the terminal device determines, according to the video playing policy, a target control algorithm used for current video playing.

703: The terminal device downloads and plays a video by using the target control algorithm.

704: The terminal device collects video playing quality indicator data in a process of downloading and playing a video.

705: The terminal device uploads the quality indicator data to the server.

706: The server adjusts the video playing policy according to the quality indicator data.

Embodiments of this application provide a video playing control method in which the server interacts with the terminal device. After starting a video playing software, the terminal device sends a video playing request to the server, and the server delivers a video playing policy to the terminal device based on the video playing request. In addition, the server may further simultaneously deliver one or more control algorithms to the terminal device, and then the terminal device determines, according to the video playing policy, a control algorithm used for current video playing. Then, the terminal device controls downloading and playing of the video by using the determined control algorithm. In the process of downloading and playing the video, the player collects video playing quality index data in real time, and reports the data to the server. The server may receive the quality indicator data uploaded by a plurality of different terminal devices when a video is played, and perform big data analysis processing, so as to determine whether a current video playing policy can take into consideration each quality indicator of video playing and whether better video playing quality can be obtained. If the current video playing policy cannot meet the requirement, the server may adjust the video playing policy, for example, use a new control algorithm or adjust parameters of an original control algorithm, so as to implement adaptive adjustment of the control algorithm. All quality indicators of video playing can be considered to achieve better video playing effect.

It should be understood that sequence numbers of the steps do not mean an execution sequence in the foregoing embodiments. The execution sequence of the processes should be determined based on functions and internal logic of the processes, and should not constitute any limitation on the implementation processes of the embodiments of this application.

For ease of understanding, the video playing control method proposed in this application is described below by using an actual application scenario.

Figure 8:
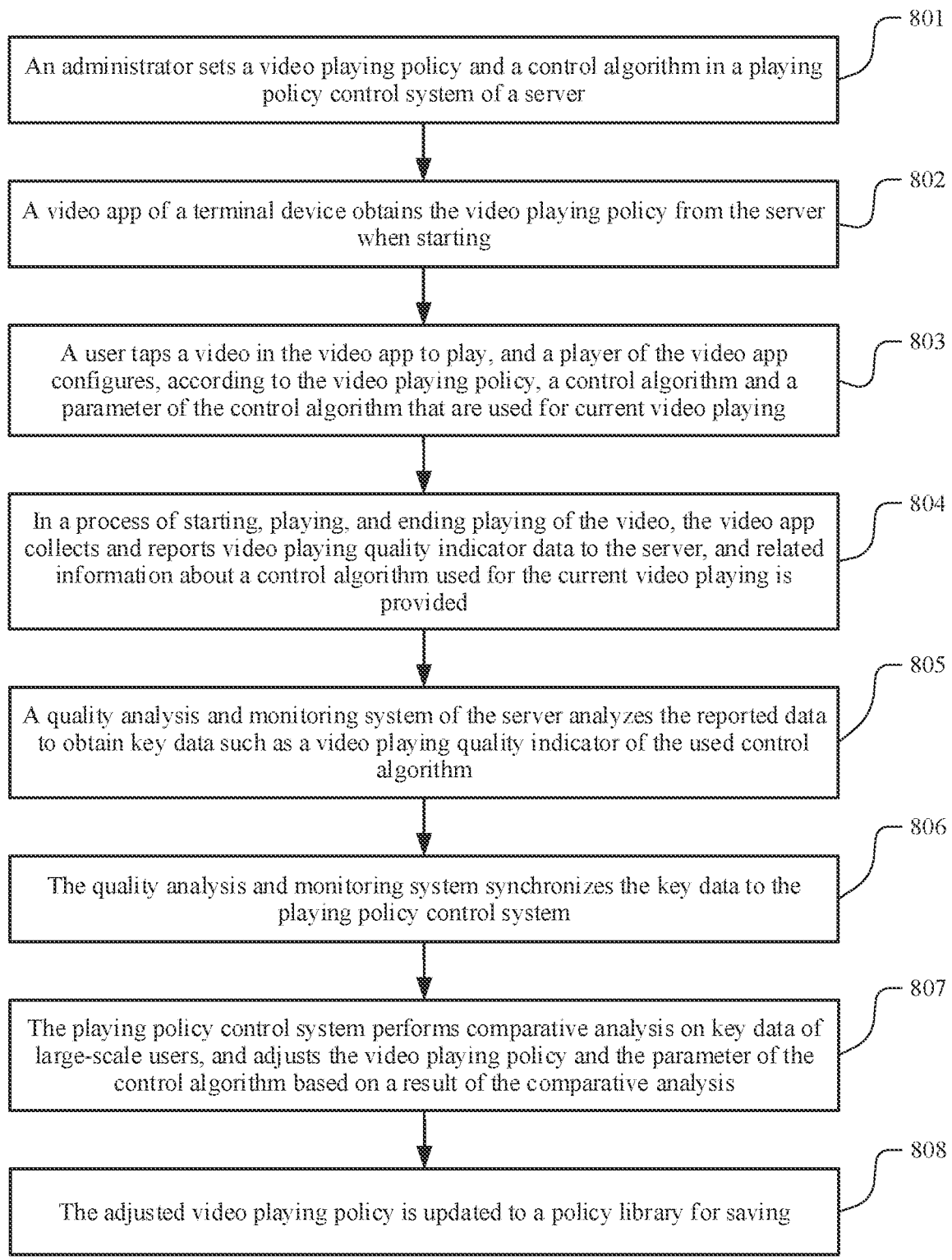
FIG. 8 is a schematic flowchart of a video playing control method in an actual application scenario according to an embodiment of this application.

FIG. 8 is a schematic flowchart of a video playing control method in an actual application scenario according to this application. The method includes the following steps.

801: An administrator sets a video playing policy and a control algorithm in a playing policy control system of a server.

802: A video app of a terminal device obtains the video playing policy from the server when being started.

803: A user taps a video in the video app to play, and a player of the video app configures, according to the video playing policy, a control algorithm and parameters that are used for current video playing.

804: In a process of starting, playing, and ending playing of the video, the video app collects and reports video playing quality index data to the server, and related information about a control algorithm used for the current video playing is provided.

805: A quality analysis and monitoring system of the server analyzes the reported data to obtain key data such as a video playing quality index of the used control algorithm.

806: The quality analysis and monitoring system synchronizes the key data to the playing policy control system.

807: The playing policy control system performs comparative analysis on key data of large-scale users, and adjusts the video playing policy and parameters of the control algorithm based on a result of the comparative analysis.

The adjusted video playing policy is updated to a policy library for saving.

For step 801, the server may include the playing policy control system and the quality analysis and monitoring system. The playing policy control system is configured to manage each video playing policy, and the quality analysis and monitoring system is configured to analyze the reported quality indicator data. An administrator of the video playing operation may preset each video playing policy and a control algorithm in the playing policy control system Specifically, the set control algorithm may include but is not limited to the following algorithms:

(1) Network Bandwidth Prediction Algorithm

1. Bandwidth Calculated by a Harmonic Average Value

If a bandwidth window list stores the latest 30 bandwidth values (a bandwidth 1 to a bandwidth 30), a predicted bandwidth is 30/(1/bandwidth 1+1/bandwidth 2+ . . . +1/bandwidth 30).

2. Bandwidth Calculated by an Average Value

If a bandwidth window list stores the latest 30 bandwidth values (a bandwidth 1 to a bandwidth 30), a predicted bandwidth is (bandwidth 1+bandwidth 2+ . . . +bandwidth 30)/30. Further, the average value calculation may further remove a certain download bandwidth that definitely deviates too much, for example, a bandwidth value that deviates from the average bandwidth by more than three times (greater than or less than three times of the average bandwidth), and calculate the average value after the bandwidth values are removed.

3. Weight-Based Bandwidth Calculation

Predicted bandwidth=historical weight×historical bandwidth+current weight×actual bandwidth. For example, the historical weight is 0.3 and the current weight is 0.7.

(2) Playing Start Predicted Algorithm

That is, how many cached data can be downloaded before video playing starts, to prevent freeze after playing starts. The amount of buffered playing start data to be downloaded depends on an estimated download rate. For example, if the download rate is more than 10 times of a bit rate, the playing can be started after data that can be used to play a video for 800 ms is downloaded. If the download rate is twice the bit rate, the playing can be started only after data that can be used to play a video for 10 s is downloaded.

(3) Playing Start Bit Rate Selection Algorithm

A playing start bit rate is selected. For example, the maximum bit rate is 480P and a bit rate is lower than the latest historical download rate×0.2.

(4) Buffer Bit Rate Switching Algorithm

Each time before downloading a next video segment, the player selects, based on a predicted bandwidth and a bandwidth attenuation coefficient, a video segment with a specific resolution or bit rate to download. The predicted download bandwidth of the user is calculated based on real-time download rates of a plurality of times by using a plurality of available methods. The bandwidth attenuation coefficient is calculated based on different watermarks (high, medium, and low) of the video buffer. For the bit rate of the next video segment, a bit rate that is not greater than and is closest to a value obtained by the predicted bandwidth multiplied by the bandwidth attenuation coefficient is selected.

1. Low Watermark Bit Rate Switching Algorithm

A value of a buffer low watermark is a buffer size×a low watermark coefficient. When the buffer watermark is low and a bit rate of a next to-be-downloaded video segment is selected, the bandwidth attenuation coefficient is set to a low value to avoid freeze. For example, if an amount of data currently downloaded in the buffer decreases, a bit rate is not switched up (that is, the bit rate of the downloaded video segment is increased) or the bit rate is slightly switched up.

2. Medium Watermark Bit Rate Switching Algorithm

The medium watermark in the buffer is between the high and low watermarks in the buffer. At the medium watermark in the buffer, the selected bandwidth attenuation coefficient is large. When an amount of data to be downloaded in the buffer is between 0.9 and 1.1 times of the buffer size, the bit rate remains unchanged, that is, the bit rate is not switched up or down.

3. High Watermark Bit Rate Switching Algorithm

A value of a buffer high watermark is the buffer size multiplied by a high watermark coefficient. When the buffer watermark is high, the bit rate can be kept unchanged, or the bit rate can be slightly switched down or radically switched up. For example, if a bit rate after the bit rate increases by one level<predicted bandwidth×high watermark bandwidth attenuation coefficient×1.5, the bit rate can increase by one level.

Factors or parameters that can be adjusted by the foregoing control algorithms include but are not limited to: a historical bandwidth weight coefficient, a current bandwidth weight coefficient, and the like of a weighing sub-algorithm of a user predicted bandwidth algorithm, a multiplier parameter of the playing start predicted algorithm, for example, the predicted bandwidth is 10 times of a bit rate of a to-be-downloaded slice, and the playing can be started after data that can be used to play a video for 800 ms is downloaded; applicable terminal types, such as mobile phones, pads, and large-screen TVs, watermark factor (buffer size, start watermark factor, medium watermark factor, high watermark factor), bandwidth factor, bandwidth factor, and the like.

For steps 802 and 803, a video app of the terminal device obtains a video playing policy from the server when being started, and when the user taps a video content to initiate playing, the bit rate adaptation algorithm determines, according to the video playing policy, a control algorithm used for current video playing. For example, a default control algorithm of the video app is A, and an adjustable control algorithm received from the server is B. If the video playing policy is set to a policy 1, the app determines to use the algorithm A and parameters or the algorithm B and parameters based on an invocation ratio. If a times invocation ratio between A and B is 3:7, in every 10 times of video playing, the app uses the algorithm A and parameters for three times of video playing and uses the algorithm B and parameters for seven times of video playing. The app records historical values of the algorithm A and algorithm B and the parameters for playing. The app determines the algorithm to be used for the current playing based on the ratio and historical values. If the video playing policy is set to a policy 2, the app uses only algorithm B and parameters to play the video. If the video playing policy is set to a policy 3, the app uses the default algorithm A and parameters to play the video. In addition, the parameter value of the algorithm B can be set based on a target of large-scale verification on the live network of the current app version. Each algorithm and factor has a unique parameter name. A plurality of values can be set for a parameter that ensures uniqueness. The plurality of values can be separated by specific symbols, for example, ";".

For step 804, in a process of starting, playing, and ending video playing, the video app collects and reports video playing quality indicator data to the server, for example, data such as a playing start delay, a zero freeze rate, and playing definition. In addition, related information about the control algorithm used in the video playing is provided, for example, whether the algorithm A or algorithm B is used.

For steps 805 to 807, a quality analysis and monitoring system of the server analyzes the reported data to obtain key data such as a video playing quality indicator of the used control algorithm, for example, a playing definition level and playing smoothness, and then synchronizes the key data to the playing policy control system. The playing policy control system can collect key data of large-scale users for comparative analysis, and adjust the video playing policy and the parameter of the control algorithm based on a result of the comparative analysis.

For example, the playing policy control system may adjust the algorithm B and the parameter based on the result of data analysis, and determine an adjusted algorithm B and parameter values by using large-scale user playing data. At the beginning, the invocation ratio of the algorithm B can be set to a low value to avoid unpredictable impacts on video playing, for example, key experience indicators such as the freeze rate and playing start delay. If the invocation ratio of the algorithm A to the algorithm B is 9:1 at the beginning, the invocation ratio of the algorithm B may be continuously increased subsequently, for example, 8:2, 7:3, 5:5, 3:7, and 2:8. After the adjustment of the algorithm B and parameters takes effect, the video playing policy can be set to 2. That is, all videos are played through the algorithm B and parameters. If the adjustment of the algorithm B and parameters has no effect, a video playing policy 3 can be used in the current app version, that is, the default algorithm A and parameters of this version are used.

The following describes an adjustment effect of the control algorithm by using an algorithm for flexibly adjusting the predicted bandwidth.

In the algorithm A, the predicted bandwidth is calculated through the harmonic average value. In the algorithm B, the predicted bandwidth is calculated through the average value (and abnormal values are excluded). For a video playing initiated by a user, the predicted bandwidths calculated by the algorithms A and B and attributes of a selected next video slice (video segment) are shown in Table 1.

TABLE 1

| Sequence number of a slice | Time (ms) | Real-time download rate (bps) | Predicted bandwidth by an algorithm A (bps) | Slice downloading resolution by an algorithm A | Predicted bandwidth by an algorithm B (bps) | Slice downloading resolution by an algorithm B |
| --- | --- | --- | --- | --- | --- | --- |
| 1 | 16:18:47.201 | 19871712 | 19871712 | 720P (HD) | 19871712 | 720P (HD) |
| 2 | 16:18:48.646 | 164512 | 326322 | 270P (smooth) | 10018112 | 480P (SD) |
| 3 | 16:18:48.810 | 16226200 | 484610 | 270P (smooth) | 12087475 | 720P (HD) |
| 4 | 16:18:48.878 | 13468200 | 638489 | 270P (smooth) | 12432656 | 720P (HD) |
| 5 | 16:18:49.003 | 19247408 | 791547 | 270P (smooth) | 17203380 | 720P (HD) |
| 6 | 16:18:49.139 | 25840128 | 944073 | 480P (SD) | 18930730 | 720P (HD) |
| 7 | 16:18:49,228 | 27838360 | 1095228 | 480P (SD) | 20415335 | 1080P (Blu-ray) |
| 8 | 16:18:54.012 | 28740520 | 1244912 | 720P (HD) | 21604647 | 1080P (Blu-ray) |
| 9 | 16:18:58.443 | 20853432 | 1390152 | 720P (HD) | 21510745 | 1080P (Blu-ray) |
| 10 | 16:19:03.115 | 9925488 | 1520945 | 720P (HD) | 20223494 | 1080P (Blu-ray) |
| 11 | 16:19:09.665 | 24583616 | 1662752 | 720P (HD) | 20659506 | 1080P (Blu-ray) |
| 12 | 16:19:14.304 | 25880888 | 1803379 | 720P (HD) | 21134177 | 1080P (Blu-ray) |
| 13 | 16:19:19.103 | 17467920 | 1936996 | 720P (HD) | 20828656 | 1080P (Blu-ray) |
| 14 | 16:19:25.323 | 30867048 | 2075974 | 1080P (Blu-ray) | 21600840 | 1080P (Blu-ray) |

As shown in the foregoing table, when the algorithm A is used, if an abnormal download rate occurs, for example, the second download rate is 164 kbps (caused by network jitter), the current and subsequent predicted bandwidths are greatly affected. The predicted bandwidth is too small than the actual bandwidth. As a result, the downloaded video slices cannot be selected with high resolution for a long time. As shown in the foregoing table, four 270P video slices and two 480P video slices are continuously downloaded due to the second abnormal download rate. If average duration of a video slice is 5 s, the user watches a smooth video for 20 s and an SD video for 10 s. After the first video slice, six video slices (30 s) are used to view a 720P HD video, and 13 video slices (65 s) are used to view a 1080P Blu-ray video.

When the algorithm B is used, the predicted bandwidth is basically the same as the actual bandwidth of the user. Network jitter mainly affects the download of the second video slice. Only one 480P video slice is downloaded. That is, the user watches an SD video for 5 s. A 1080P Blu-ray video is displayed after six video slices (30 s). In the first 30 s, a 720P HD video is displayed. It is clear that using the algorithm B greatly improves the video quality for the user, but compared with that of the algorithm A, a probability of frame freezing is higher. After the quality indicator data is analyzed and the algorithm B and parameters of the algorithm B are dynamically adjusted, the optimal video viewing effect can be achieved by combining the video quality with the playing start delay and zero freeze rate.

For step 808, the adjusted video playing policy may be updated to a policy library for saving, so that the video playing policy can be used next time.

Figure 9:
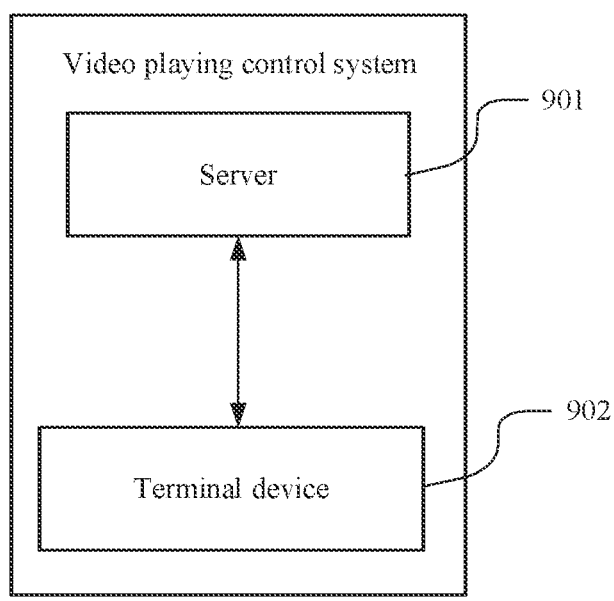
FIG. 9 is a block diagram of a structure of a video playing control system according to an embodiment of this application.

Corresponding to the video playing control method described in the foregoing embodiments, FIG. 9 is a block diagram of a structure of a video playing control system according to an embodiment of this application. For ease of description, only a part related to this embodiment of this application is shown.

Refer to FIG. 9. The system includes a server 901 and a terminal device 902.

The server 901 is configured to: after receiving a video playing request sent by a terminal device, and send a video playing policy to the terminal device, where the video playing policy is used to determine information about a control algorithm used for current video playing: receive video playing quality index data uploaded by the terminal device, where the quality index data is collected and obtained by the terminal device in a process of downloading and playing a video; and adjust the video playing policy according to the quality indicator data.

The terminal device 902 is configured to: after receiving the video playing policy, determine, according to the video playing policy, a target control algorithm used for current video playing; download and play a video by using the target control algorithm; collect video playing quality indicator data in a process of downloading and playing a video; and upload the quality indicator data to the server.

Further, the terminal device may be further configured to: obtain a device type of the terminal device; select, according to the video playing policy, a control algorithm corresponding to the device type from a plurality of preset control algorithms as the target control algorithm.

Further, the terminal device may be further configured to: receive a first control algorithm delivered by the server; determine a version number of video playing software used for video playing: search locally or from the server for a preset second control algorithm associated with the version number; and select the target control algorithm from the first control algorithm and the second control algorithm according to the video playing policy.

Further, the terminal device may be further configured to: obtain a historical record of each control algorithm used by the video playing software to play a video; determine an invocation ratio of the first control algorithm according to the video playing policy; and select a control algorithm from the first control algorithm and the second control algorithm according to the historical record and the invocation ratio as the target control algorithm.

Further, the terminal device may be further configured to upload the quality indicator data to the server, to indicate the server to adjust the invocation ratio based on the quality indicator data.

Further, the terminal device may be further configured to: if the target control algorithm is the first control algorithm, upload the quality indicator data to the server, to indicate the server to adjust the first control algorithm and parameters of the first control algorithm according to the quality indicator data.

Further, the terminal device may be further configured to: if the target control algorithm is the first control algorithm, and the quality indicator data meets a preset condition, cancel an association relationship between the second control algorithm and the version number, and associate the first control algorithm with the version number.

Further, the terminal device may be further configured to upload information about the selected target control algorithm to the server, so as to indicate the server to analyze the quality indicator data based on the information about the selected target control algorithm; and generates a video playing quality indicator of the first control algorithm and a video playing quality indicator of the second control algorithm.

Further, the terminal device may be further configured to detect a current network download rate: if the network download rate exceeds a first threshold, obtain a video segment that has been buffered in a local buffer; and if the resolution of the buffered video segment is less than a second threshold and/or the bit rate is less than a third threshold, download a video segment whose resolution is greater than or equal to the second threshold and/or the bit rate is greater than or equal to the third threshold in a same time period, and replace the buffered video segment.

Further, the server may be further configured to: receive the information that is about the target control algorithm and that is uploaded by the terminal device; and analyze the quality indicator data based on the information about the target control algorithm, to generate a video playing quality indicator of the target control algorithm.

Figure 10:
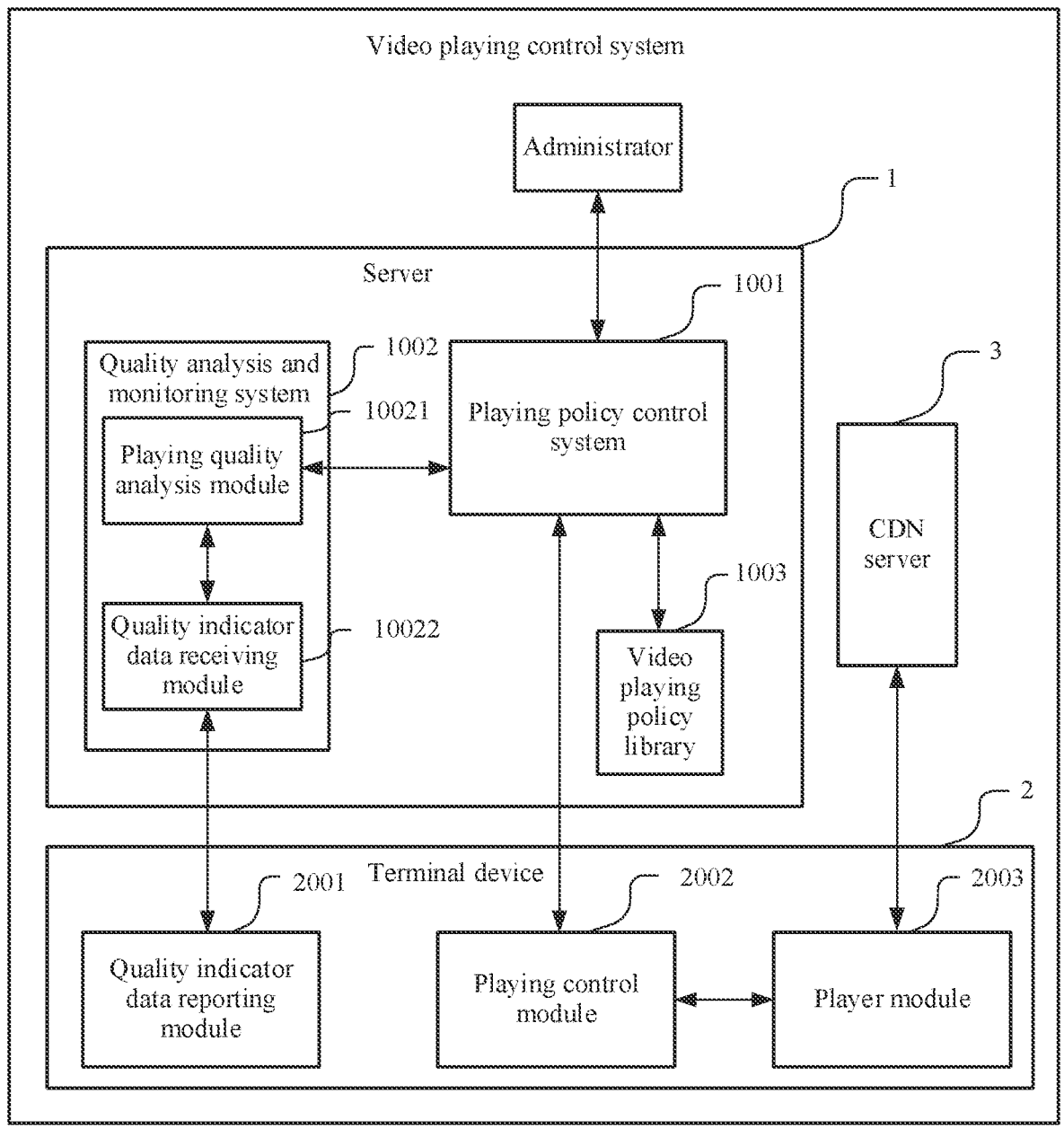
FIG. 10 is a schematic diagram of a structure of a video playing control system in an actual application scenario according to an embodiment of this application.

FIG. 10 is a schematic diagram of a structure of the video playing control system in an actual application scenario.

In FIG. 10, the video playing control system includes a server 1, a terminal device 2, and a CDN server 3. The server 1 includes a playing policy control system 1001, a quality analysis and monitoring system 1002, and a video playing policy library 1003. The quality analysis and monitoring system 1002 includes a playing quality analysis module 10021 and a quality index data receiving module 10022. The terminal device 2 includes a quality index data reporting module 2001, a playing control module 2002, and a player module 2003.

An operating principle of the video playing control system is as follows.

The administrator may set each video playing policy, and each control algorithm and parameter in the playing policy control system 1001, and may store the set video playing policy in the video playing policy library 1003. When a video is played, the playing control module 2002 of the terminal device 2 first sends a request to the playing policy control system 1001 of the server 1, so as to obtain the video playing policy and a control algorithm that can dynamically adjust parameters. Then, the playing policy control system 1001 searches the video playing policy library 1003 for a video playing policy, and delivers the found policy to the play control module 2002. Next, the play control module 2002 determines a control algorithm and parameters to be used according to the received video playing policy, and configures the player module 2003. Then, the player module 2003 downloads and plays the video from the CDN server 3 according to the configured algorithm and parameters. At a stage of starting, playing, and ending of the video playing, the quality index data reporting module 2001 collects quality index data of the current video playing and uploads the data to the quality analysis and monitoring system 1002. The quality analysis and monitoring system 1002 receives data by using the quality index data receiving module 10022, and sends the data to the playing quality analysis module 10021 for data analysis. The playing quality analysis module 10021 synchronizes a result of the data analysis to the playing policy control system 1001, and then the playing policy control system 1001 may adjust the delivered video playing policy according to the result of the data analysis, and further adjust the control algorithm or parameters currently used by the player module 2003, to achieve better video playing. Finally, the adjusted video playing policy may be stored in the video playing policy library 1003 for further use next time.

It should be noted that, the playing policy control system 1001, the quality analysis and monitoring system 1002, and the video playing policy library 1003 may be separately disposed in different servers, for example, a playing policy server and an analysis and monitoring server, and the servers exchange data.

Figure 11A:
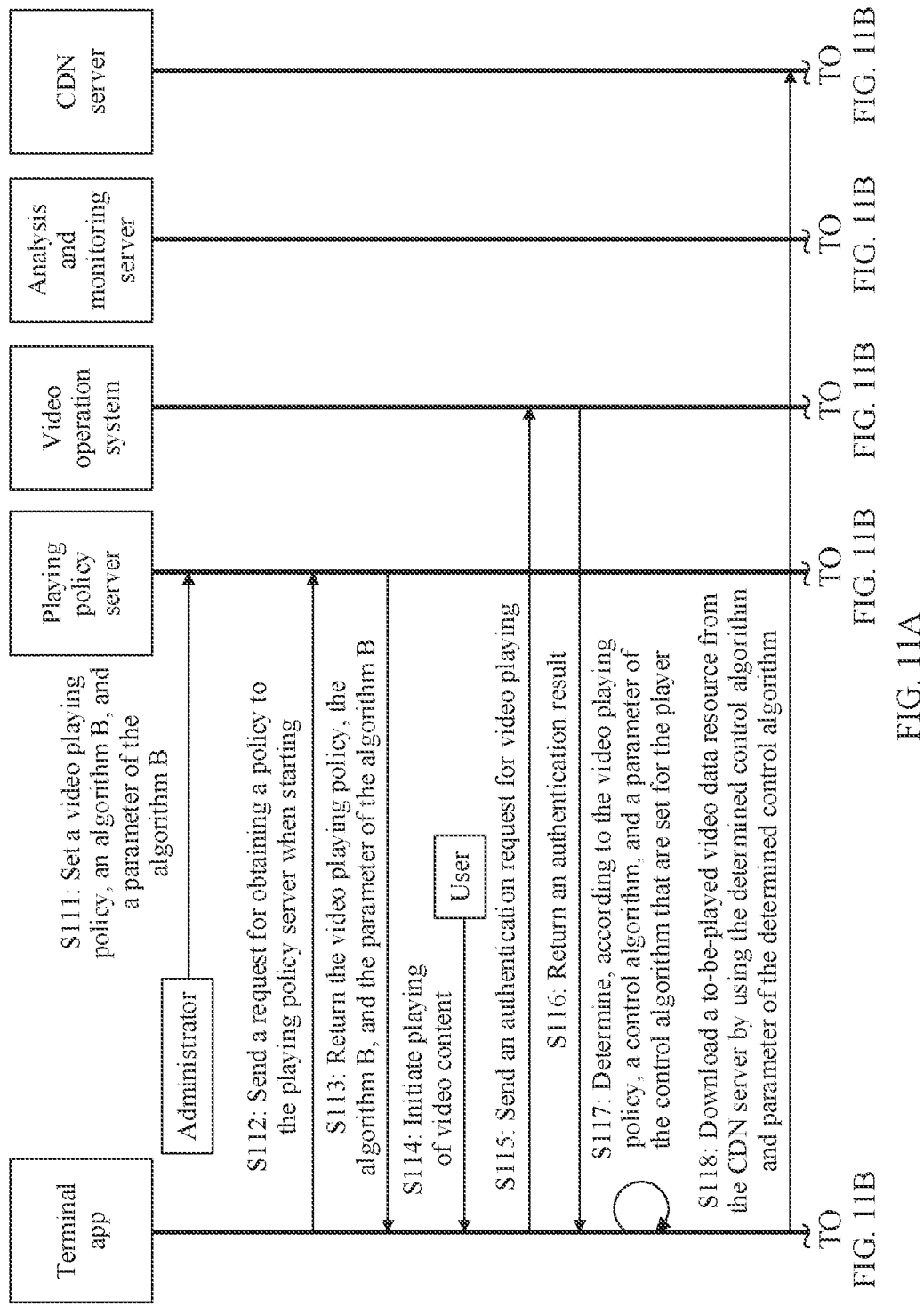
FIG. 11A and FIG. 11B are a schematic diagram of a service processing process of a video playing control system according to an embodiment of this application.
Figure 11B:
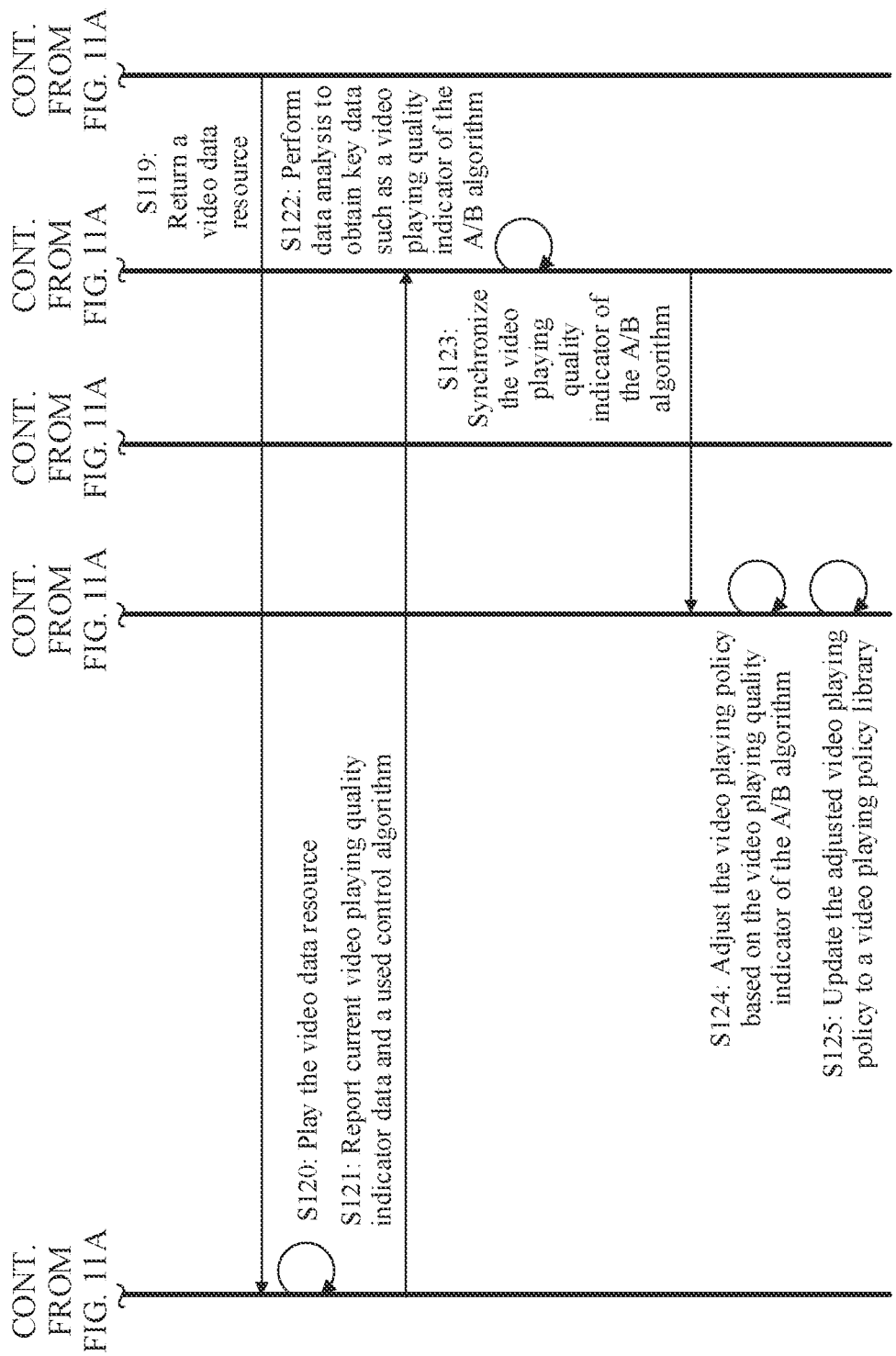

FIG. 11A and FIG. 11B are a schematic diagram of a service processing process of a video playing control system according to an embodiment of this application.

In a service processing flow shown in FIG. 11A and FIG. 11B, a default control algorithm of a video app is an algorithm A, and an adjustable control algorithm received from a play policy server is an algorithm B. The service processing flow is specifically as follows.

S111: an administrator sets a video playing policy, and an algorithm B and parameters on the playing policy server.

S112: When starting, the terminal app sends a policy obtaining request to the playing policy server.

S113: The playing policy server returns the video playing policy, the algorithm B and parameters to a terminal app.

S114: A user initiates playing of video content on the terminal app.

S115: The terminal app sends an authentication request for video playing to a video operation system.

S116: The video operation system authenticates the current video playing, and returns an authentication result to the terminal app.

S117: If an authentication result is successful, the terminal app determines, according to the video playing policy, a control algorithm (the algorithm A or algorithm B) and parameters that are set for a player.

S118: The terminal app downloads the to-be-played video data resource from a CDN server by using the determined control algorithm and parameters.

S119: The terminal app receives the video data resource returned by the CDN server.

S120: The terminal app plays the video data resource.

S121: The terminal app reports quality index data of the current video playing and the used control algorithm to the analysis and monitoring server.

S122: The analysis and monitoring server performs data analysis based on the received quality indicator data uploaded by a large quantity of users, to obtain key data such as a video playing quality indicator of the A/B algorithm.

S123; The playing quality analysis and monitoring server synchronizes the video playing quality index of the A/B algorithm to the playing policy server, which may be specifically synchronized by period (for example, 12 hours).

S124: The playing policy server adjusts the video playing policy according to the video playing quality index of the A/B algorithm.

S125: The play policy server updates the adjusted video playing policy to a video playing policy library.

An embodiment of this application further provides a computer-readable storage medium. The computer-readable storage medium stores a computer program. When the computer program is executed by a processor, steps of the video playing control method provided in this application are implemented.

An embodiment of this application further provides a computer program product. When the computer program product runs on a terminal device, the terminal device is enabled to perform steps of each video playing control method provided in this application.

Figure 12:
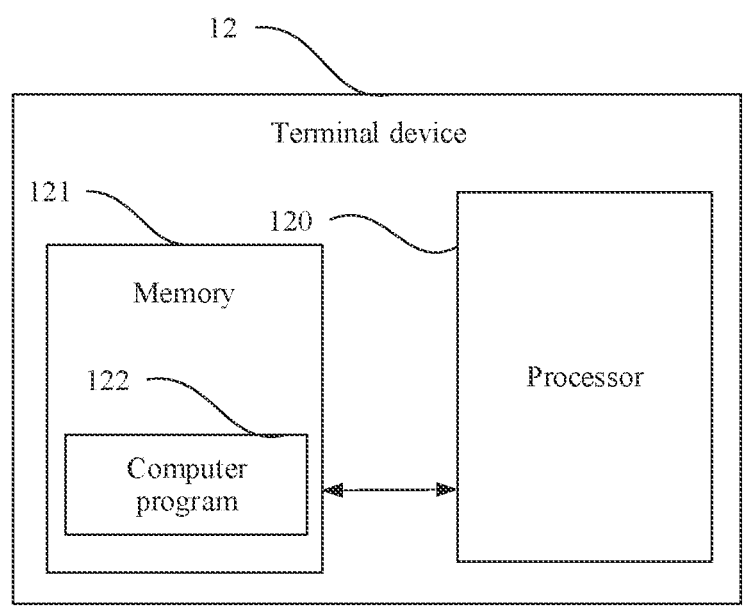
FIG. 12 is a schematic diagram of a terminal device according to an embodiment of this application.

FIG. 12 is a schematic diagram of a structure of a terminal device according to an embodiment of this application. As shown in FIG. 12, the terminal device 12 in this embodiment includes: at least one processor 120 (only one processor is shown in FIG. 12), a memory 121, and a computer program 122 that is stored in the memory 121 and can run on the at least one processor 120. When executing the computer program 122, the processor 120 implements steps in any of the foregoing video playing control method embodiments.

The terminal device 12 may be a computing device such as a desktop computer, a notebook computer, a palmtop computer, or a cloud server. The terminal device may include but is not limited to a processor 120 and a memory 121. A person skilled in the art may understand that FIG. 13 is merely an example of the terminal device 12, and does not constitute a limitation on the terminal device 12. The terminal device 12 may include more or fewer components than those shown in the figure, or combine some components, or different components. For example, the device may further include an input/output device, a network access device, and the like.

The processor 120 may be a central processing unit (Central Processing Unit, CPU). The processor 120 may alternatively be another general-purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic device, or a discrete hardware component. The general-purpose processor may be a microprocessor, any conventional processor, or the like.

In some embodiments, the memory 121 may be an internal storage unit of the terminal device 12, for example, a hard disk or a memory of the terminal device 12. In some other embodiments, the memory 121 may alternatively be an external storage device of the terminal device 12, for example, a removable hard disk, a smart media card (Smart Media Card, SMC), a secure digital (Secure Digital, SD) card, a flash card (Flash Card), or the like that is equipped with the terminal device 12. Further, the memory 121 may alternatively include both an internal storage unit and an external storage device of the terminal device 12. The memory 121 is configured to store an operating system, an application, a boot loader (BootLoader), data, and another program, for example, program code of the computer program. The memory 121 may further be configured to temporarily store data that has been output or is to be output.

It may be clearly understood by a person skilled in the art that, for convenient and brief description, division of the foregoing function units and modules is merely used as an example for illustration. In actual application, the foregoing functions can be allocated to different function units and modules and implemented based on a requirement, that is, an inner structure of the system is divided into different function units and modules to implement all or some of the functions described above. Functional units and modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the function units or modules are merely provided for distinguishing the units from one another, but are not intended to limit the protection scope of this application. For a specific working process of the units or modules in the foregoing system, refer to a corresponding process in the foregoing method embodiments. Details are not described herein again.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A video playing control method implemented by a terminal device, wherein the video playing control method comprises:
   obtaining a video playing policy that determines first information about a first control algorithm used for video playing;
   receiving, from a server, a second control algorithm;
   determining a version number of a video playing software used for video playing;
   searching, locally or from the server, for a preset third control algorithm associated with the version number;
   selecting, from the second control algorithm and the preset third control algorithm and according to the video playing policy, the first control algorithm;
   downloading and playing, using the first target control algorithm, a video;
   collecting, in a process of downloading and playing the video, video playing quality indicator data; and
   uploading, to a server, the video playing quality indicator data to instruct the server to adjust the video playing policy based on the video playing quality indicator data.

2. The video playing control method of claim 1, further comprising:
   obtaining a device type of the terminal device; and
   selecting, according to the device type and the video playing policy, from the second control algorithm and the preset third control algorithm, the first control algorithm.

3. The video playing control method of claim 1, further comprising:
   obtaining a historical record of each control algorithm used by the video playing software to play a video;
   determining, according to the video playing policy, an invocation ratio of the second control algorithm; and
   selecting, from the second control algorithm and the preset third control algorithm and based on the historical record and the invocation ratio, the first control algorithm.

4. The video playing control method of claim 3, further comprising further uploading, to the server, the video playing quality indicator data to instruct the server to adjust the invocation ratio based on the video playing quality indicator data.

5. The video playing control method of claim 1, wherein after collecting the video playing quality indicator data, the video playing control method further comprises:
   identifying that the first control algorithm is the second control algorithm; and further uploading, in response to identifying that the first control algorithm is the second control algorithm, the video playing quality indicator data to the server to instruct the server to adjust the second control algorithm and parameters of the second control algorithm based on the video playing quality indicator data.

6. The video playing control method of claim 1, wherein after collecting the video playing quality indicator data, the video playing control method further comprises:
identifying that the first control algorithm is the second control algorithm and the video playing quality indicator data meets a preset condition;
cancelling, in response to identifying that the first control algorithm is the second control algorithm and the video playing quality indicator data meeting the preset condition, an association relationship between the preset third control algorithm and the version number; and
associating, in response to identifying that the first control algorithm is the second control algorithm and the video playing quality indicator data meeting the preset condition, the second control algorithm with the version number.

7. The video playing control method of claim 1, wherein after uploading the video playing quality indicator data to the server, the video playing control method further comprises:
uploading second information about the first control algorithm to the server to instruct the server to analyze the video playing quality indicator data based on the second information; and
generating a first video playing quality indicator of the second control algorithm and a second video playing quality indicator of the preset third control algorithm.

8. The video playing control method of claim 1, wherein, in the process of downloading and playing the video, the video playing control method further comprises:
detecting a current network download rate;
obtaining a first video segment that has been buffered in a local buffer when the network download rate exceeds a first threshold; and
when a first resolution of the first video segment is less than a second threshold or a first bit rate of the first video segment is less than a third threshold:
downloading a second video segment comprising a second resolution greater than or equal to the second threshold and a second bit rate greater than or equal to the third threshold in a same time period; and
replacing the first video segment with the second video segment.

9. A terminal device comprising:
a memory configured to store instructions; and
a processor coupled to the memory, wherein the instructions cause the processor to be configured to:
obtain a video playing policy that determines first information about a first control algorithm used for video playing;
receive, from a server, a second control algorithm;
determine a version number of a video playing software used for video playing;
search, locally or from the server, for a preset third control algorithm associated with the version number;
select, from the second control algorithm and the preset third control algorithm and according to the video playing policy, the first control algorithm;
download and play, using the first control algorithm, a video;
collect, in a process of downloading and playing the video, video playing quality indicator data; and
upload, to a server, the video playing quality indicator data to instruct the server to adjust the video playing policy based on the video playing quality indicator data.

10. A computer program product comprising computer-executable instructions that are stored on a non-transitory computer-readable storage medium and that, when executed by a processor, cause a terminal device to:
obtain a video playing policy that determines first information about a first control algorithm used for video playing;
receive, from a server, a second control algorithm;
determine a version number of a video playing software used for video playing;
search, locally or from the server, for a preset third control algorithm associated with the version number;
select, from the second control algorithm and the preset third control algorithm and according to the video playing policy, the first control algorithm;
download and play, using the first control algorithm, a video;
collect, in a process of downloading and playing the video, video playing quality indicator data; and
upload, to a server, the video playing quality indicator data to instruct the server to adjust the video playing policy based on the video playing quality indicator data.

11. The computer program product of claim 10, wherein the computer-executable instructions further cause the terminal device to:
obtain a device type of the terminal device; and
select, according to the device type and the video playing policy, from the second control algorithm and the preset third control algorithm, the first control algorithm.

12. The computer program product of claim 10, wherein the computer-executable instructions further cause the terminal device to:
obtain a historical record of each control algorithm used by the video playing software to play a video;
determine, according to the video playing policy, an invocation ratio of the second control algorithm; and
select, from the second control algorithm and the preset third control algorithm and based on the historical record and the invocation ratio, a first control algorithm.

13. The computer program product of claim 12, wherein the computer-executable instructions further cause the terminal device to further upload, to the server, the video playing quality indicator data to instruct the server to adjust the invocation ratio based on the video playing quality indicator data.

14. The computer program product of claim 10, wherein after collecting the video playing quality indicator data, the computer-executable instructions further cause the terminal device to:
identify that the first control algorithm is the second control algorithm; and
further upload, in response to identifying that the first control algorithm is the second control algorithm, the video playing quality indicator data to the server to instruct the server to adjust the second control algorithm and parameters of the second control algorithm based on the video playing quality indicator data.

15. The computer program product of claim 10, wherein after collecting the video playing quality indicator data, the computer-executable instructions further cause the terminal device to:
- identify that the first control algorithm is the second control algorithm and the video playing quality indicator data meets a preset condition;
- cancel, in response to identifying that the first control algorithm is the second control algorithm and the video playing quality indicator data meeting the preset condition, an association relationship between the preset third control algorithm and the version number; and
- associate, in response to identifying that the first control algorithm is the second control algorithm and the video playing quality indicator data meeting the preset condition, the second control algorithm with the version number.

16. The computer program product of claim 10, wherein after uploading the video playing quality indicator data to the server, the computer-executable instructions further cause the terminal device to:
- upload second information about the first control algorithm to the server to instruct the server to analyze the video playing quality indicator data based on the second information; and
- generate a first video playing quality indicator of the second control algorithm and a second video playing quality indicator of the preset third control algorithm.

17. The computer program product of claim 10, wherein, in the process of downloading and playing the video, the computer-executable instructions further cause the terminal device to:

detect a current network download rate;

obtain a first video segment that has been buffered in a local buffer when the network download rate exceeds a first threshold; and when a first resolution of the first video segment is less than a second threshold or a first bit rate of the first video segment is less than a third threshold:
- download a second video segment comprising a second resolution greater than or equal to the second threshold and a second bit rate greater than or equal to the third threshold in a same time period; and
- replace the first video segment with the second video segment.

* * * * *